(12) United States Patent
Schileru-Key

(10) Patent No.: US 6,580,441 B2
(45) Date of Patent: Jun. 17, 2003

(54) GRAPH-BASED VISUAL NAVIGATION THROUGH STORE ENVIRONMENTS

(75) Inventor: Rodica Schileru-Key, San Jose, CA (US)

(73) Assignee: Vergics Corporation, San Jose, CA (US)

(*) Notice: Subject to any disclaimer, the term of this patent is extended or adjusted under 35 U.S.C. 154(b) by 0 days.

(21) Appl. No.: 10/092,813

(22) Filed: Mar. 6, 2002

(65) Prior Publication Data

US 2002/0093541 A1 Jul. 18, 2002

Related U.S. Application Data

(62) Division of application No. 09/287,088, filed on Apr. 6, 1999, now Pat. No. 6,388,688.

(51) Int. Cl.[7] .................................................. G06F 3/00
(52) U.S. Cl. .......................... 345/805; 345/854; 705/26
(58) Field of Search ................................ 345/700, 744, 345/762, 764, 765, 781, 803–805, 835, 839, 848, 850, 853–855, 419, 440; 705/26, 27

(56) References Cited

U.S. PATENT DOCUMENTS

| | | | |
|---|---|---|---|
| 4,860,123 A | * 8/1989 | McCalley et al. | 386/106 |
| 5,555,354 A | 9/1996 | Strasnick et al. | 345/427 |
| 5,602,564 A | 2/1997 | Iwamura et al. | 345/782 |
| 5,642,171 A | 6/1997 | Baumgartner et al. | 348/515 |
| 5,643,084 A | 7/1997 | Mirsky | 463/9 |

(List continued on next page.)

FOREIGN PATENT DOCUMENTS

EP        0 660 289        6/1995

OTHER PUBLICATIONS

Darken et al: "Map Usage in Virtual Environments: Orientation Issues" Proceedings IEEE Virtual Reality (Cat. No. 99CB36316), Proceedings of Virtual Reality, Houston, TX USA, Mar. 13–17, 1999, pp. 133–140, XP002142329, 1999, Los Alamitos, CA USA, IEEE Comput. Soc, USA, ISBN: 0–7695–0093–5.

Pich: "3D im Web" Chip Zeitschrift Fuer Mikrocomputer-Technik, DE, Vogel Verlag. Wurzburg, No. 2, Feb. 1, 1997, pp. 192–195, XP000656986, ISSN: 0170–6632.

*Primary Examiner*—Crescelle N. dela Torre
(74) *Attorney, Agent, or Firm*—Bingham McCutchen LLP; Fabio E. Marino; Erin C. Ming

(57) ABSTRACT

A computer system and method of operation thereof are provided that allow interactive navigation and exploration of spatial enviroments, both real and virtual. The computer system employs a data architecture comprising a network of nodes connected by branches. Each node in the network represents an intersection in the real environment that allows a user of the computer system to select which path to follow. Likewise, each branch in the network represents a path connecting physcial intersections in the real environment. The network is constructed directly from a map of the target environment. Navigation data such as image frame sequences, intersections between paths, and other related information are associated with the elements of the network. This establishes a direct relationship between locations in the environment and the data which represent them. From such an organization, the user may tour the environment, viewing the image sequences associated with each path and choosing among intersecting paths at will. The computer system of the present invention is suitable for applications such as developing training materials for complex procedures, building video games or interactive exhibits, authoring stories with multiple alternative endings, creating virtual shopping malls and virtual stores, or allowing virtual visits to remote sites (e.g., museums, historic sites, etc).

12 Claims, 22 Drawing Sheets

Microfiche Appendix Included
(4 Microfiche, 210 Pages)

U.S. PATENT DOCUMENTS

| | | | |
|---|---|---|---|
| 5,748,196 A | 5/1998 | Coelho et al. | 345/716 |
| 5,801,687 A | 9/1998 | Peterson et al. | 707/500.1 |
| 5,808,613 A | 9/1998 | Marrin et al. | 345/850 |
| 5,819,245 A | 10/1998 | Peterson et al. | 706/16 |
| 5,848,399 A | 12/1998 | Burke | 705/27 |
| 5,874,956 A | 2/1999 | LaHood | 345/854 |
| 6,026,376 A * | 2/2000 | Kenney | 705/26 |
| 6,091,417 A * | 7/2000 | Lefkowitz | 345/854 |
| 6,097,393 A | 8/2000 | Prouty, IV et al. | 345/419 |
| 6,147,686 A * | 11/2000 | Brown et al. | 345/839 |
| 6,388,688 B1 * | 5/2002 | Schileru-Key | 345/854 |

* cited by examiner

GRAPH-BASED VISUAL NAVIGATION THROUGH STORE ENVIRONMENTS

CROSS REFERENCE TO RELATED APPLICATION

This application is a divisional of U.S. patent application Ser. No. 09/287,088, filed Apr. 6, 1999, now U.S. Pat. No. 6,388,688, entitled "Graph-Based Visual Navigation Through Spatial Environments".

Microfiche Appendix A, which is part of the present disclosure, is an appendix consisting of two sheets of microfiche containing a total of 132 frames, microfiche Appendix B, which is part of the present disclosure, is an appendix consisting of single sheet containing a total of 44 frames and microfiche Appendix C, which is part of the present disclosure, consists of a sheet containing 34 frames of a computer program and related data, according to an embodiment of the invention. These listings of computer program contains material which is subject to copyright protection. The copyright owner has no objection to the facsimile reproduction by anyone of the patent document or the present disclosure, as it appears in the Patent and Trademark Office patent files or records, but otherwise reserves all copyright rights whatsoever.

BACKGROUND OF THE INVENTION

1. Field of the Invention

The present invention relates generally to computer programs and, particularly, to computer systems used to navigate virtual environments.

2. Related Art

The most common method of presenting a virtual tour of a real, physical environment is film or videotape. While such a presentation offers high visual accuracy, the progress of the tour is generally limited to a single, static route chosen by the photographer or editor. In other words, the observer of the tour has none of the choices usually available to someone who is physically in the environment: choices such as turning one way or the other at an intersection, skipping uninteresting paths, or proceeding directly to a favorite location. The observer's interaction with the environment is limited to commands such as start, stop, fast forward or reverse. A further limitation of this approach is that the observer generally has no other context than the image, itself. That is, the limited field of view makes it difficult for the observer to orient him/herself in a complex environment.

For tours of virtual environments, computer systems are commonly used to render images from models representing the virtual environments. As opposed to videotaped presentations, such systems can be highly interactive since the images are rendered in real time. There is, however, a tradeoff between cost and visual accuracy. Computer systems capable of rendering very high-resolution images in real time are prohibitively expensive, while more affordable systems produce inferior quality images.

SUMMARY OF THE INVENTION

The present invention relates to a computer system which allows interactive navigation and exploration of spatial environments, both real and virtual. The computer system employs a data architecture comprising a network of nodes connected by branches. Each node in the network represents an intersection in the real environment that allows a user of the computer system to select which path to follow. Likewise, each branch in the network represents a path connecting physical intersections in the real environment.

The network is constructed directly from a map of the target environment. Navigation data such as image frame sequences, intersections between paths, and other related information are associated with the elements of the network. This establishes a direct relationship between locations in the environment and the data which represent them. From such an organization, the user may tour the environment, viewing the image sequences associated with each path and choosing among intersecting paths at will.

In addition to navigating through the environment, the user may also access auxiliary information that is related to particular points of interest. This auxiliary information can be of varying forms: video, audio, still images, etc. Such information is linked to a point of interest through the associated network element. By associating this information with the virtual environment, the computer system of the present invention is able to provide the observer with an enhanced view of the real environment represented by the virtual environment.

DETAILED DESCRIPTION OF THE INVENTION

Figure 8:
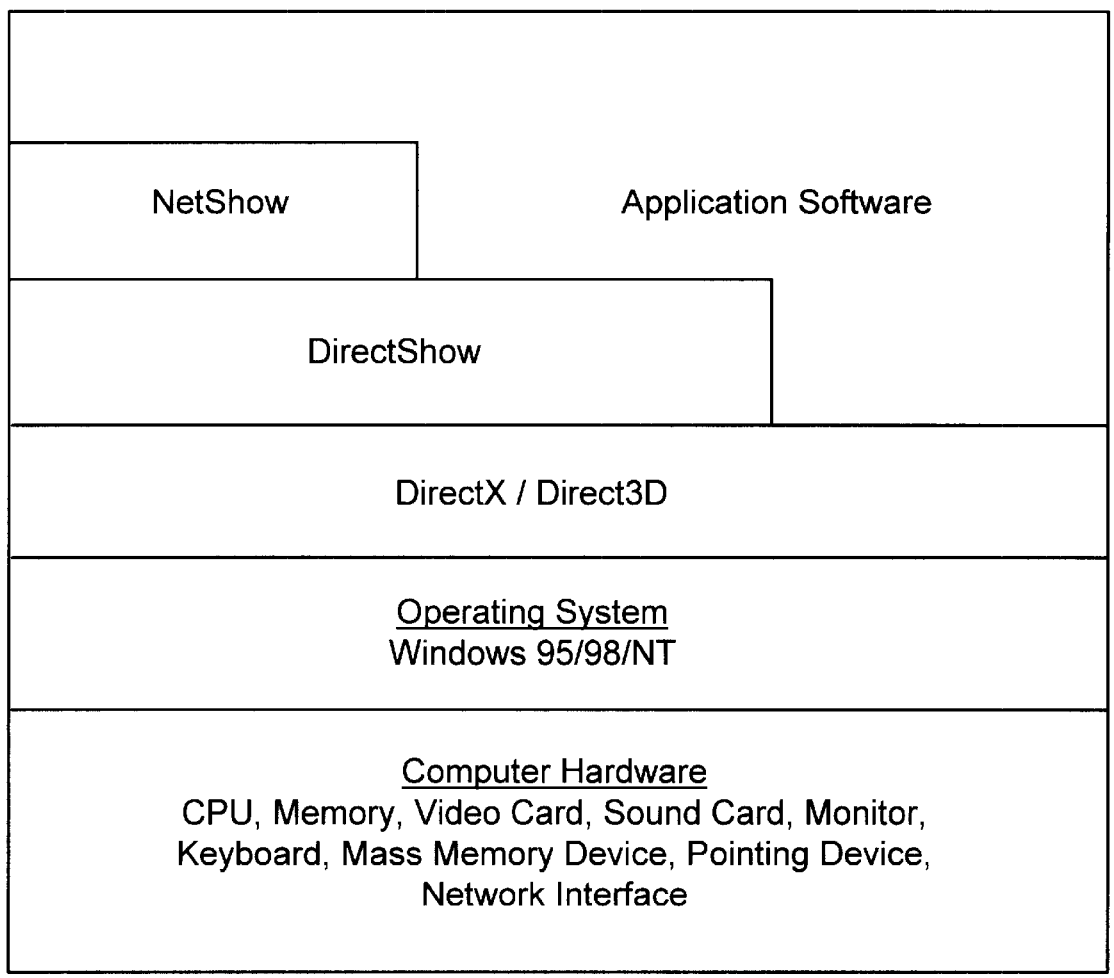
FIG. 8 illustrate the hardware and software structure of a computer system, in accordance to an embodiment of the invention.

As disclosed herein, the present invention includes a method and a computer software system for composing and executing interactive tours of spatial environments. FIG. 8 illustrates the hardware and software context of the present invention. The computer hardware specified is representative of modern multimedia computer systems. Such systems contain a central processing unit (CPU) and memory, a video card to generate images, and a sound card to generate sound. The images are displayed on an electronic computer display monitor. One example of a suitable CPU and memory for the computer system is a Pentium processor, 200 Mhz, with 32 MB RAM. The display must be capable of 16-bit color.

The computer hardware further includes a keyboard and pointing device for data input. As is understood by those skilled in the art, the pointing device may be a mouse, trackball, joystick, or other similar device. The computer system further includes a mass storage device and/or a network interface. Either a mass storage device or a computer network may be used to store large data such as image files. Suitable mass storage devices will have the characteristics of very large capacity as well as very fast, random access. An example of a suitable mass storage device is a CD-ROM drive. An example of a suitable computer network is the World Wide Web.

The software context described in FIG. 8 includes a computer operating system and several service layers of computer software. Examples of suitable operating systems are Windows95, Windows98 and Windows NT 4.0, available from Microsoft Corp. of Redmond, Wash. The present invention requires services provided by three software service applications, NetShow, DirectShow, and DirectX/Direct3D, also available from Microsoft Corp. As illustrated in FIG. 8, the application software of the present invention has interfaces with each of these three service applications.

Those skilled in the art realize that other hardware/software platforms can be used in lieu of the ones described herein in accordance to the principles of the present invention. Accordingly, the invention is not limited to any particular hardware/software platform.

Figure 1:
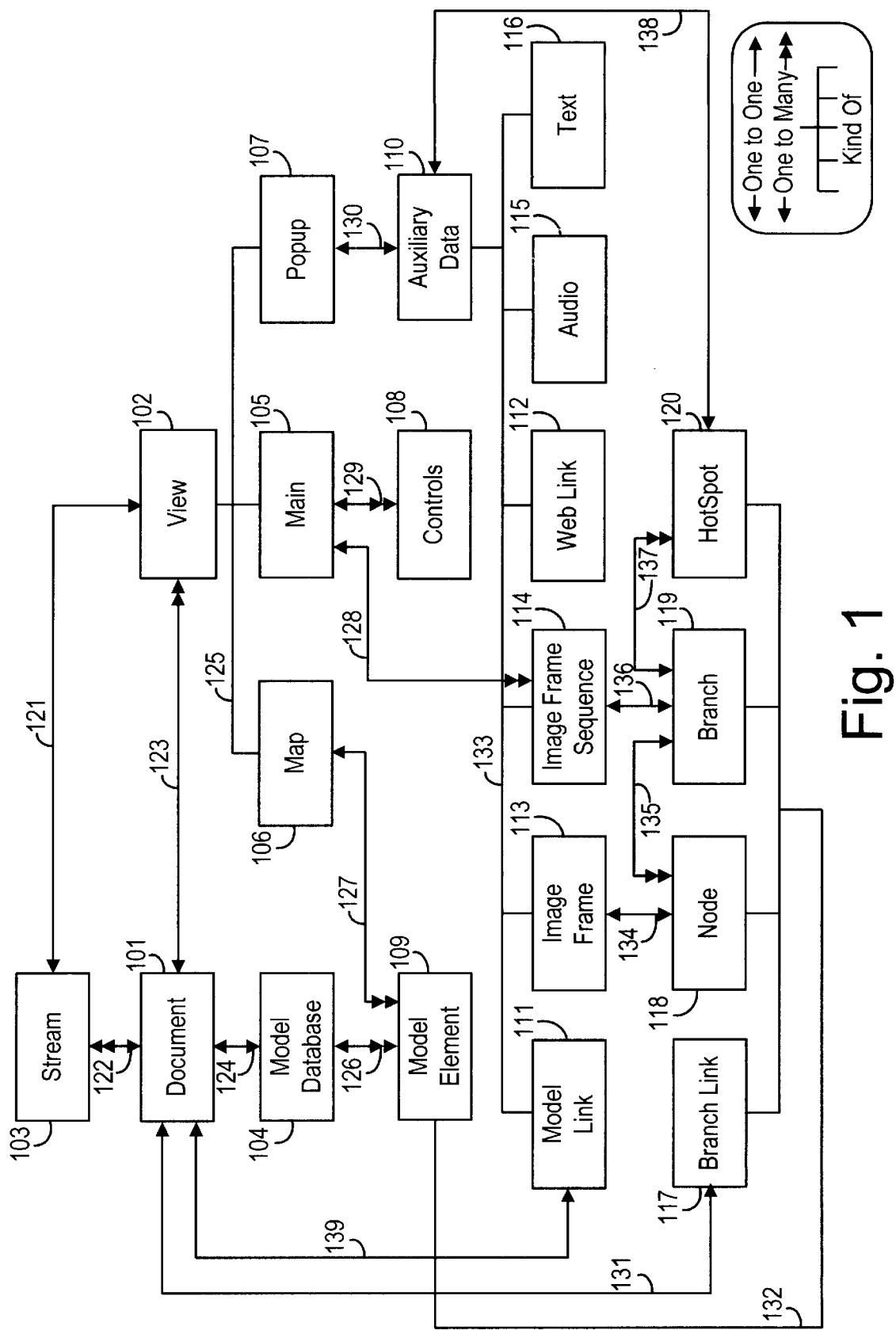
FIG. 1 is a block diagram that illustrates the architecture of the principal design constructs of the present invention.

FIG. 1 illustrates the architecture of the present invention. Rectangles in the figure identify design constructs, while arrows between rectangles identify relationships between constructs. As illustrated by the legend in the lower right end corner of FIG. 1, arrows with a single head on each end (e.g., arrow 121) indicate a one to one relationship between corresponding constructs, while arrows with a single head on one hand and a double head on the other end (e.g., arrow 123) indicate a one-to-many relationship between corresponding constructs.

Documents 101 are the primary construct of the architecture, representing a complete navigational model. Views 102 display some aspect of the document in a window of the computer display. Each view 102 is typically associated with a display window. Relationship 123 indicates that a single document 101 may be displayed using multiple views 102. Relationship 125 indicates that three distinct types of views are used: main views 105, map views 106, and popup views 107. In one embodiment, main view 105 displays image frame sequences associated with each path on the tour, as illustrated by arrow 128. Main view 105 also contains user controls 109, as illustrated by arrow 129. Map view 106, in turn, displays an interactive map of the environment, including tour paths, intersections, and points of interest (HotSpots) that allow users of the computer system to access auxiliary information. Popup views 107 display auxiliary data 110 associated with HotSpots, as illustrated by arrow 130.

Each document 101 may manage multiple streams 103, as illustrated by arrow 122. Each stream 103, in turn, provides data to a view 102, as illustrated by arrow 121. These data is contained in one or more stream files, whose names are stored in model database 104. Each document 101 is associated with a single model database 104 that contains the complete data for the document's navigation model, as illustrated by arrow 124. Model database 104 contains multiple model elements 108 that make up the navigation model, as illustrated by arrow 126. Relationship 132 indicates that four kinds of model elements are used. Nodes 118 represent intersections. Pairs of nodes 118 are connected by branches 119, that represent paths between intersections, as illustrated by arrow 135. A single node 118 may serve as a connecting point for two or more branches 119. HotSpots 120 represent points of interest that enable users to access auxiliary data 110. HotSpots are placed along branches 119, as illustrated by arrow 137. Branch links 117 allow users to transition from one model document to another, as illustrated by arrow 131. Branch links 117 allow traversal between independent navigation models, represented by different documents. Each model element 108 is displayed in a map view 106 as an element of the interactive map, as illustrated by arrow 127.

Relationship 133 indicates that auxiliary data 110 may take several forms. Model links 111 are similar to branch links 117 insofar as they connect documents 101, as illustrated by arrow 139. However, while a branch link jumps unconditionally to a new model, replacing the current model, a model link initiates a new model within the context of the current model. When a new model is terminated, program execution returns to the location of the model link. A web link 112 connects the model to a World Wide Web page. When a web link 112 is executed, the program launches a user's default web browser to access a URL associated with web link 112. In such case, the browser acts as a popup view 107. Auxiliary data 110 displayed in a popup view 107 may also include single images 113, image frame sequences 114, audio clips 115, and text documents 116. When display of auxiliary data 110 is terminated, execution returns to the location of HotSpot 120 in the original model. Users may terminates display of auxiliary data 110 either by closing popup view 107 or by selecting one of the controls in main view 105.

Figure 2:
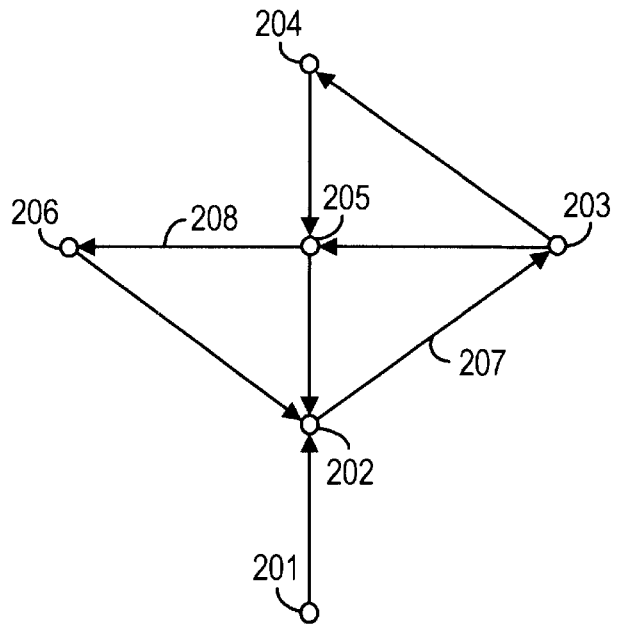
FIG. 2 illustrates an example of the network of nodes and branches that is the underlying representation of the navigation model.

FIG. 2 illustrates a graphical representation of the navigational model, hereafter referred to as "the model ". The model is conceptually a network of nodes and connecting branches. The network is represented as a directed, cyclic graph. Each node of the graph represents an endpoint or intersection in the model, and each branch represents a path in the model. For example, branch 207 connecting nodes 202 and 203, represents a path in the model between the intersections represented by nodes 202 and 203. Furthermore, the orientation of the arrow on branch 207 indicates that the associated path is directional, leading from node 202 to node 203.

Figure 3:
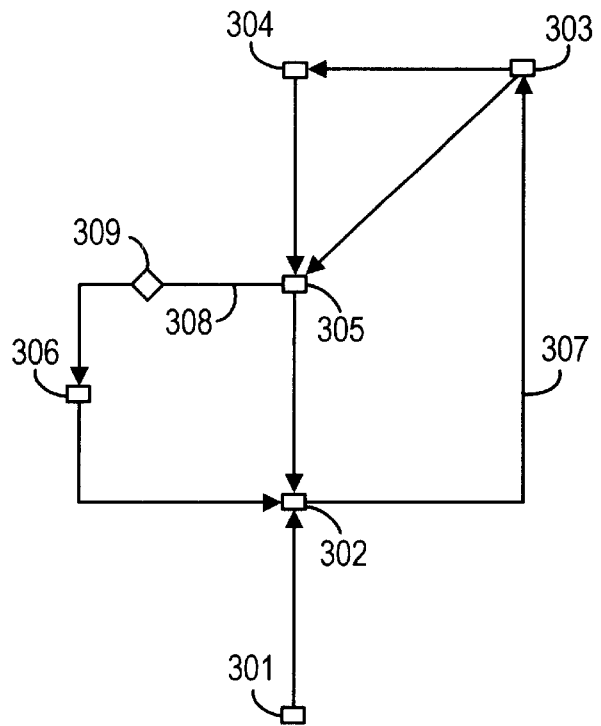
FIG. 3 illustrates one possible map that can be realized from the network shown in FIG. 2.

In one embodiment, the model of FIG. 2 is displayed to the user as a map of the environment, as shown in FIG. 3. Thus, intersections 301–306 of FIG. 3 correspond to nodes 201–206 of FIG. 2. Paths on the map are not necessarily straight lines (i.e., a path may be composed of multiple, connected line segments). Path 307, constructed of two segments, corresponds to branch 207. In addition to intersections and paths, the map also displays HotSpots located along paths. For example, HotSpot 309 is located along path 308. Since in the model HotSpots are associated with branches, HotSpot 309 is associated with branch 208 that, in turn, corresponds to path 308.

Each branch in the model is associated with an image sequence that is displayed to the user during the course of the tour. In one embodiment, the sequence is a video clip shot while moving along the associated path in the real environment. The sequence may take other forms as well, such as computer-animated image frames showing a path through a virtual environment. Image sequences may reside on the host computer, or may reside on remote servers located anywhere on the World Wide Web. For instance, in some embodiments, image sequences may be shown using streaming video.

HotSpots represent a linkage between an area of a navigation frame, typically an object in the frame, and a set of associated data. A HotSpot is represented on the map by an icon and in the main view image display by a bounded region of interest (ROI). A HotSpot's associated data may take a variety of forms including, but not limited to, video sequences, animations, audio clips, text, still images, and World Wide Web links. When a HotSpot is activated during the course of the tour, the associated data is displayed in a popup view window.

Given the underlying structure of the data, the following sections describe the operations that manipulate the data. The present invention provides three classes of capabilities: initialization, authoring (constructing and modifying the model), and playback (navigating the model).

Overview of Program Execution

When the program is started, a map view window 1120 (FIG. 11) is initialized with intersections, paths, and HotSpots retrieved from model database 104. The default starting intersection, as defined in model database 104, is the initial start position. Main view window 1110 shows the image frame associated with the starting intersection, as well as any path choices 1130 leading away from the starting intersection.

Figure 12:
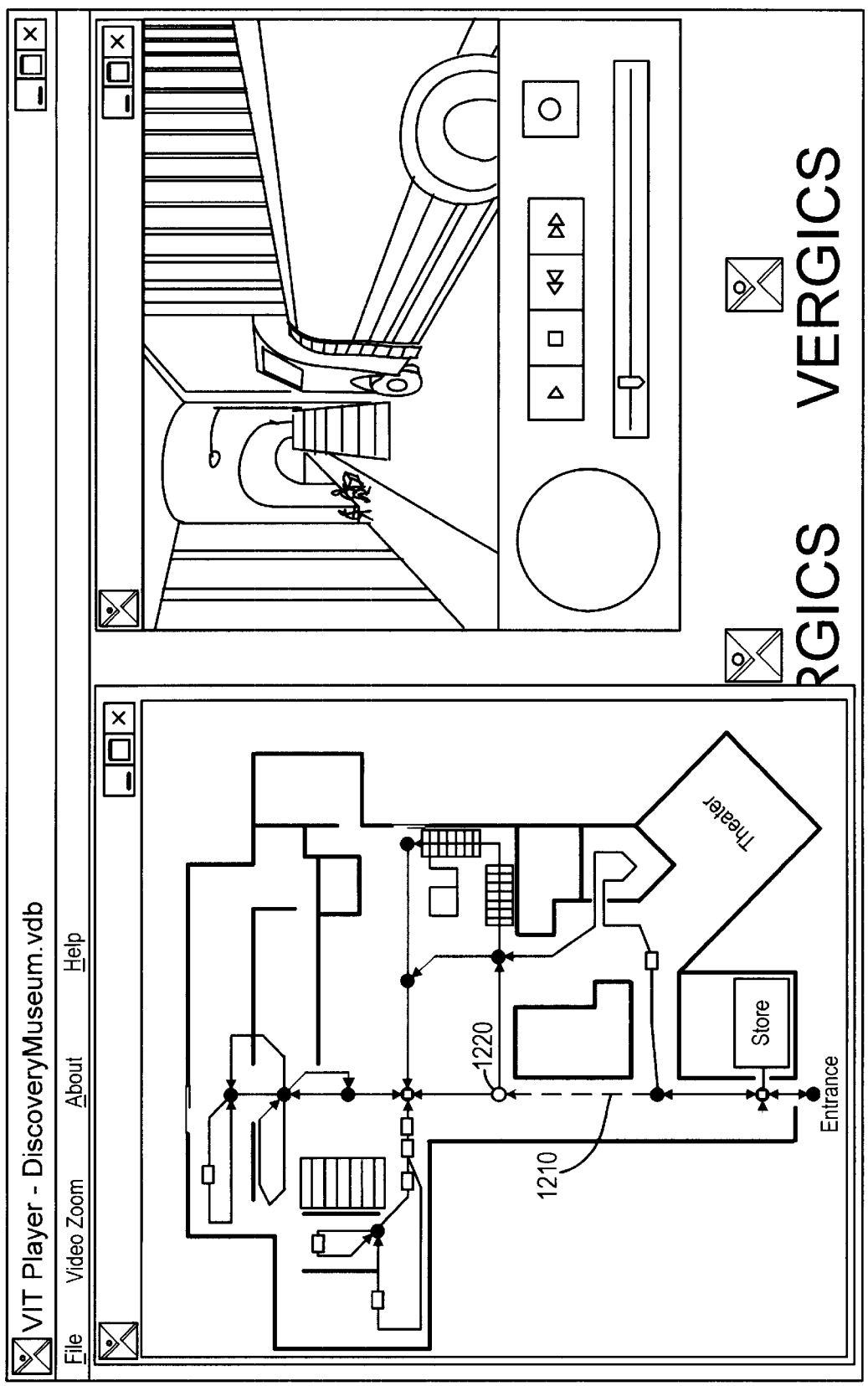

When the user selects a choice, the path represented by that choice and any destination intersections are highlighted in map view window 1120 (e.g., path 1210 and node 1220 in FIG. 12). The program plays the image sequence associated with the path (FIG. 12). Any HotSpots on the current path are highlighted on the map as the image sequence nears their locations, and the user receives both a visual and audio queue to the HotSpot's proximity (FIGS. 13–16).

Figure 11:
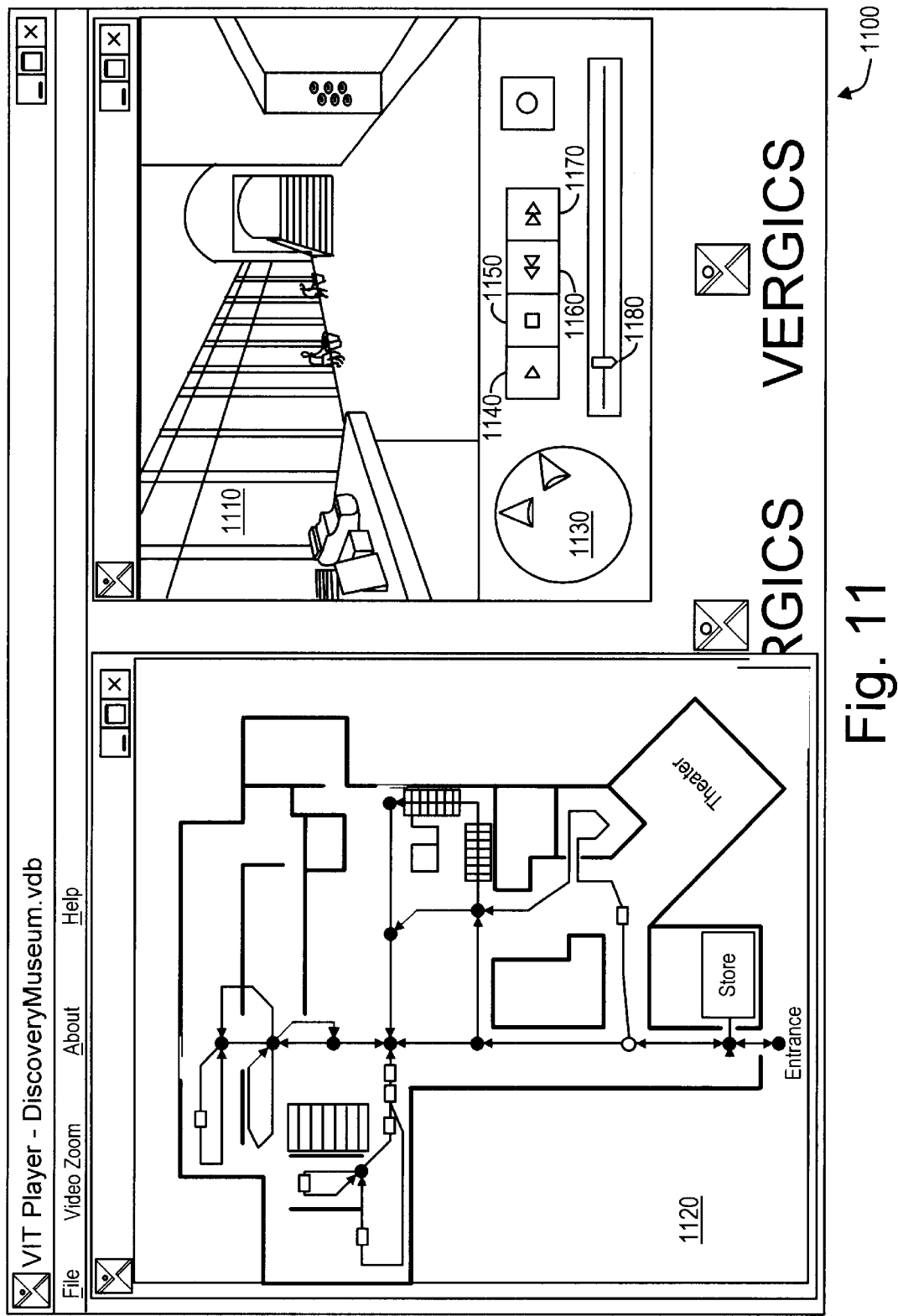
FIGS. 11–16 show a window displayed on a screen of a display device of the computer system of FIG. 8, at successive points during navigation of a virtual environment.

As each image frame is decoded, the program updates the current frame number (or sample time). When the current frame approaches the end of the sequence range associated with the current path, the program displays the path choices available at the upcoming intersection (FIG. 11). If the user does not select a choice before the image sequence reaches the intersection, image playback is paused. If the user does select a choice, image playback proceeds directly with the image sequence for the selected path (i.e. image playback is not paused at the intersection).

The user may also control program execution in other ways. For example., the user can pause and continue image playback at will, and can jump to an arbitrary intersection by simply selecting a corresponding icon in map view window 1120. Similarly, the user can jump to any HotSpot in the model by selecting a corresponding icon in map view window 1120.

Initialization

In the case of the authoring tool, the program is initialized by simply starting the software application. In the case of the player the following operations are performed:

Startup

This operation first creates a document, a model database, a stream object and a main view. A reference to the model database is then passed to the stream object and a reference to the stream object is added to the document.

Load Model File

This operation opens a model database file, connects the main view to the stream object created during Startup, creates a map view, and connects the map view to the main view stream object. The model database created during Startup is then populated with the contents of the model database file. A map is drawn using a bitmap file. Path, intersections, and HotSpots from the model are overlaid on the background. The start position is initially set to the start node and the intersection icon is highlighted on a map displayed in map view window 1120.

Display Initial Image

Ths initial stream is opened and the image frame associated with the starting node is displayed in main view window 1110. User controls are attached to main view window 1110 and the stream is set to Pause, waiting for user input.

Authoring

Figure 17:
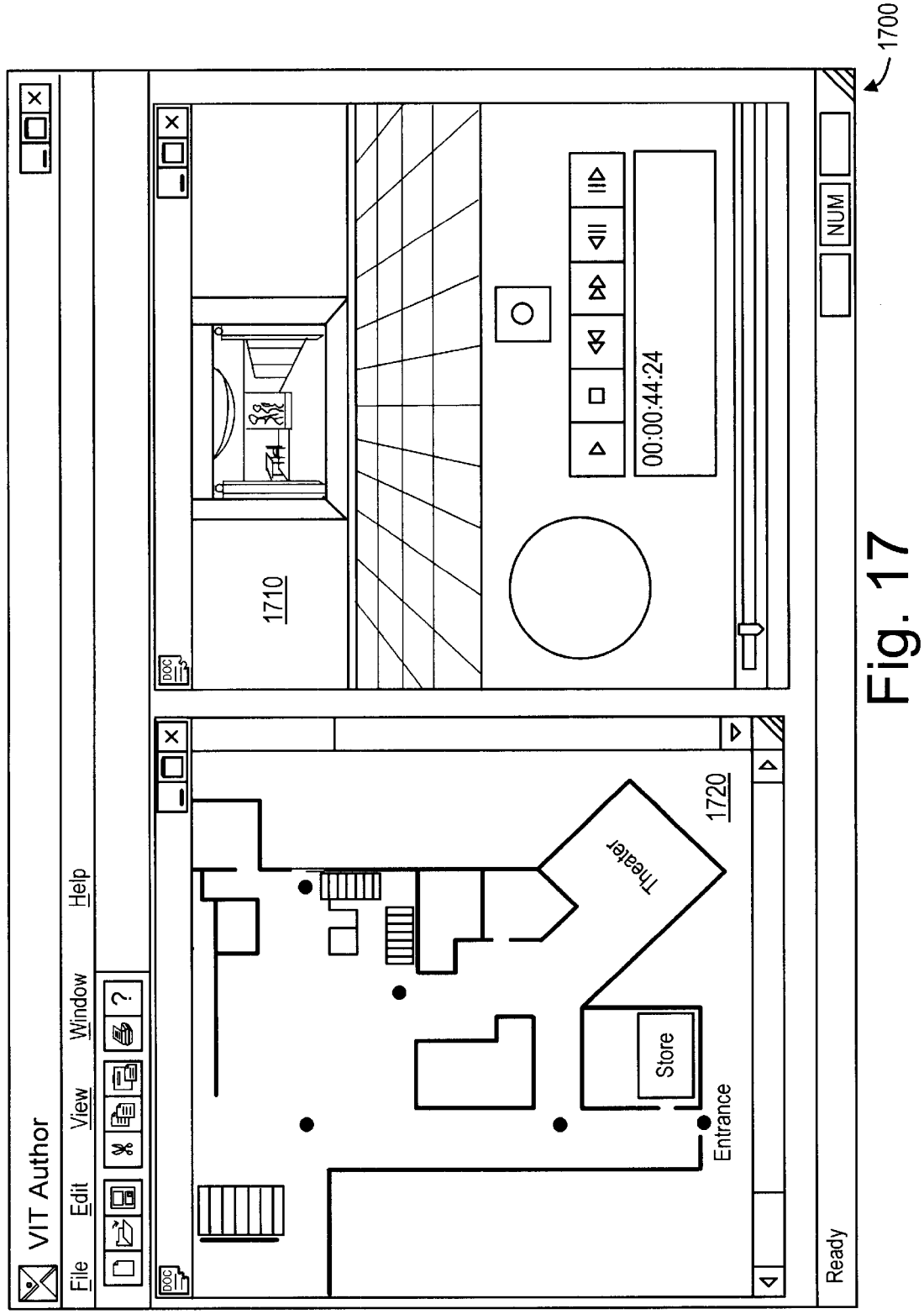
FIGS. 17–22 show a window displayed on a screen of a display device of the computer system of FIG. 8, at successive points during authoring of a virtual environment.

The general process of authoring is to construct a model by drawing elements in a map view window 1720 (FIG. 17) that are viewed in main view window 1710. Construction of a model typically begins with a diagram of the environment, a set of image sequences, and auxiliary data. The diagram is displayed as a bitmap in map view window 1720. The user defines model elements by drawing them over the diagram. For each path defined, the user selects an image sequence from main view window 1710 and attaches the image sequence to the path. For each HotSpot defined, the user selects auxiliary data and associates the auxiliary date with the HotSpot. Editing operations allow the user to modify the contents of any model element. The authoring program enables the user to perform the following operations:

Add Node: The user designates the location of the node on the map displayed in map view window 1720. This operation draws an intersection icon at the designated location, as shown in FIG. 17, creates the node in the model, and records the location of the intersection in the node.

Delete Node: The user selects an intersection icon on the map displayed in map view 1720. This operation removes the intersection icon from the map and deletes the associated node from the model. If the node is the start or end point of any branches, the branches are deleted as well (see operation Delete Branch).

Figure 19:
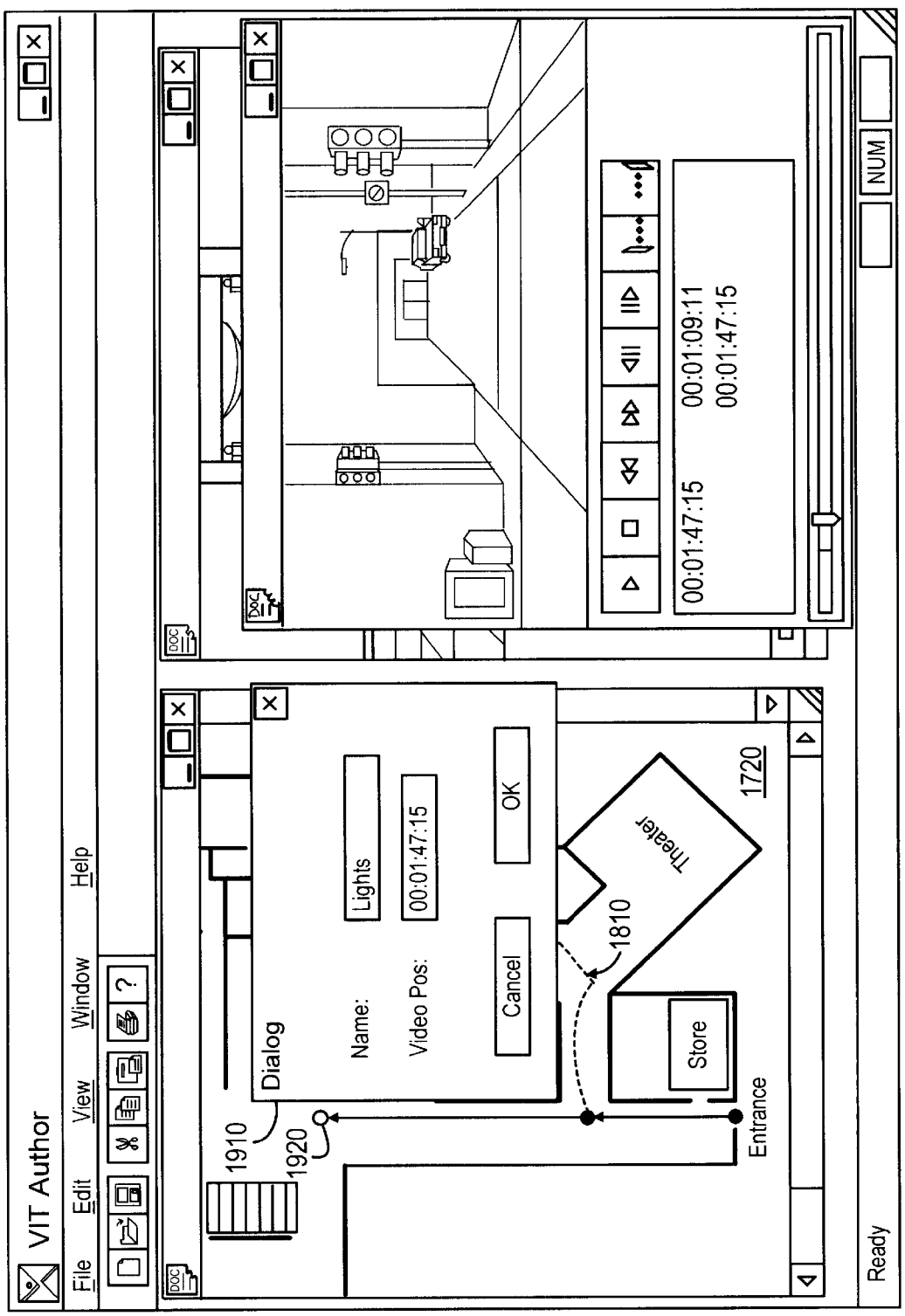

Edit Node: The user selects an intersection icon on the map displayed in map view window 1720. This operation then displays a dialog 1910 (FIG. 19) wherein the user can modify any of the data contained in the associated node 1920.

Figure 18:
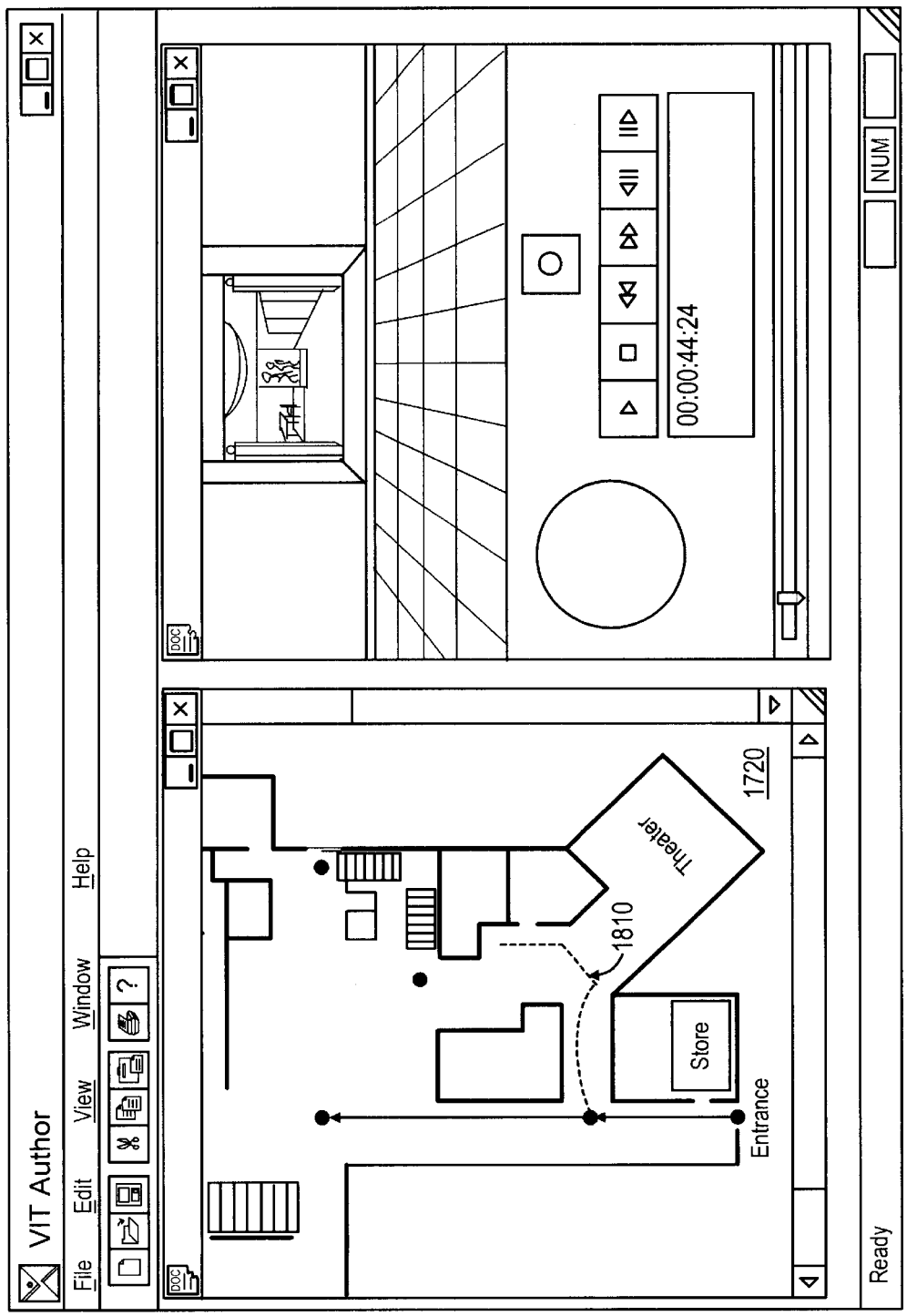

Add Branch: The user draws a path on the map displayed in map view window 1720. To draw the path, the user starts at any intersection and then draws a series of connected line segments 1810 that end at another intersection (FIG. 18). The shape of the path should closely approximate the shape of the actual path followed to produce the image sequence for the path. The user then designates a start and an end of the image sequence for the branch by selecting image frames in main window 1710. This operation creates a branch in the model, records a specification of the path (including all segments) in the branch, records references to the start and end nodes in the branch, and adds a reference to the branch to its start and end nodes.

Delete Branch: The user selects a path on the map displayed in map view window 1720. This operation removes the path from the map displayed in map view window 1720, deletes the associated branch from the model, and removes references to the branch from the two nodes connected by the branch.

Figure 20:
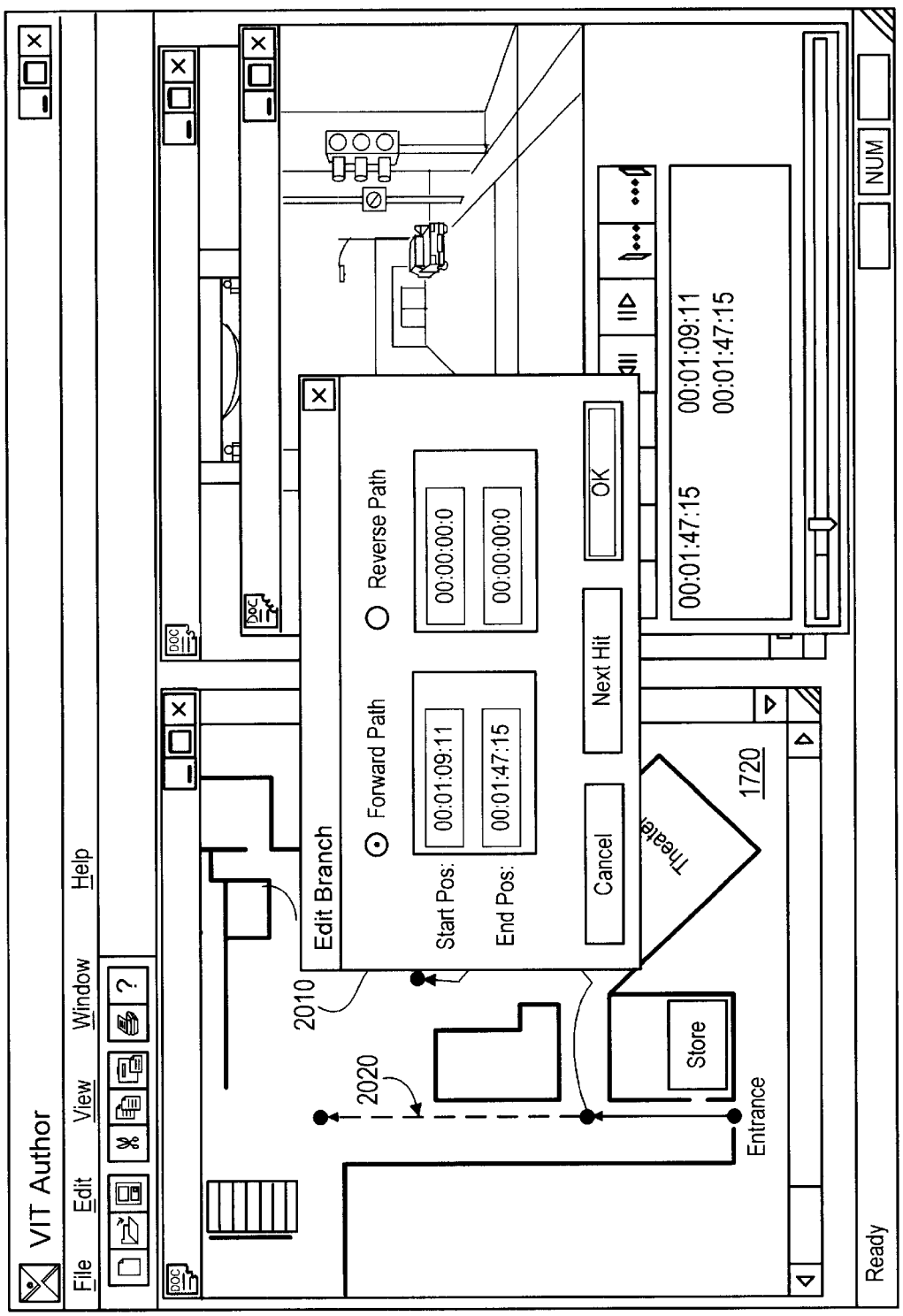

Edit Branch: The user first selects a path on the map displayed in map view window 1720. Then a dialog 2010 is displayed to allow the user to modify any of the data contained in the associated branch 2020, as shown in FIG. 20.

Figure 21:
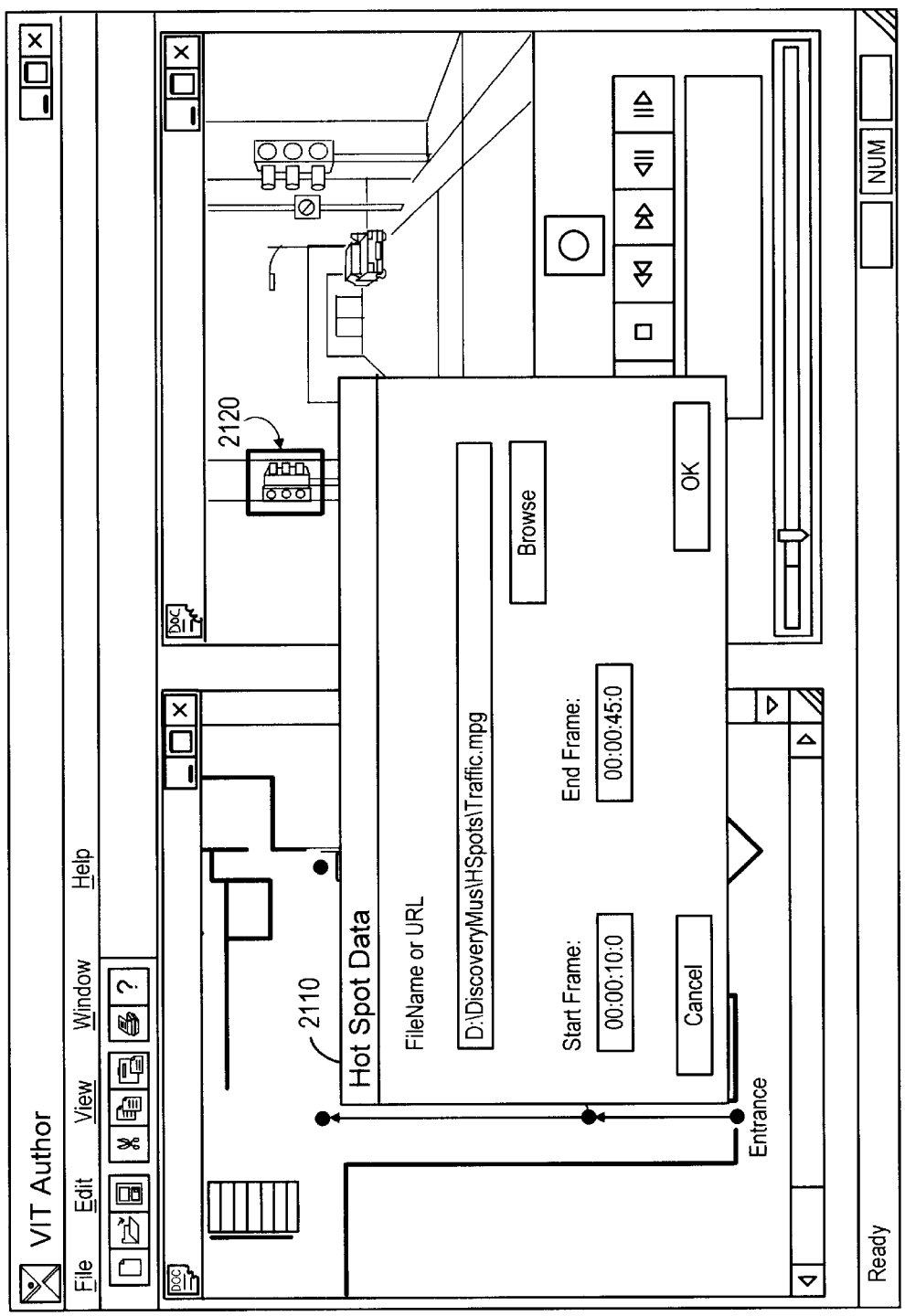
Figure 22:
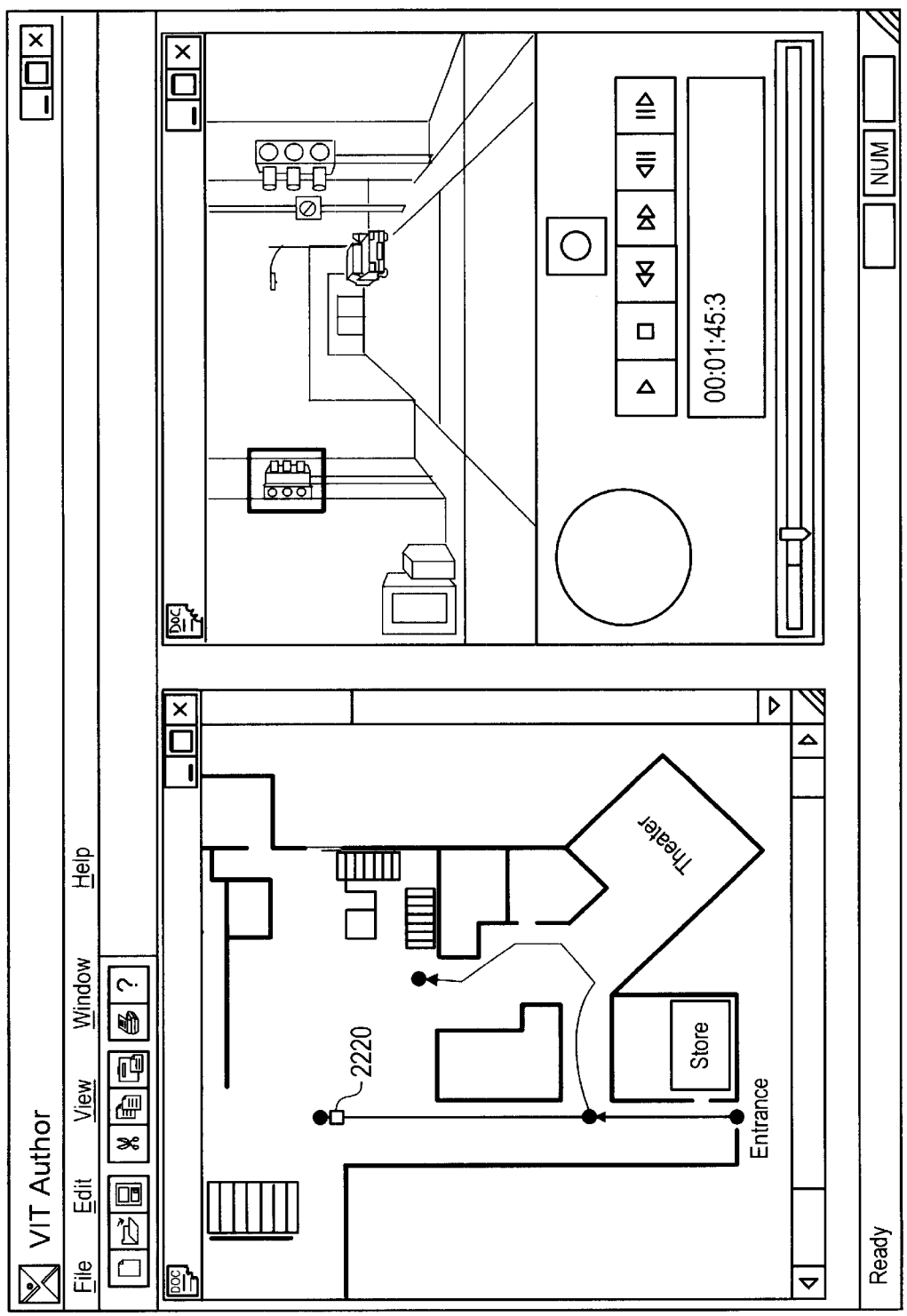

Add HotSpot: The user defines a HotSpot in main window 1710 with the image sequence paused at the desired frame (the image sequence must already have been assigned to a branch). The user then defines a HotSpot area by drawing a bounding figure around a region of interest 2120 in main view window 1710 (FIG. 21). The user specifies data to be associated with the HotSpot in a popup dialog 2110 (FIG. 21). This operation uses the offset of the image frame within the sequence to interpolate a position along the associated path on the map. Based on this information a Hotspot icon 2220 is drawn at a corresponding location on the map (FIG. 22).

Delete HotSpot: The user selects a HotSpot icon on the map displayed in map view window 1720. The HotSpot icon is removed from the map, the associated HotSpot is deleted from the model and removes any references to the HotSpot are deleted from all branches associated with the HotSpot.

Edit HotSpot: The user selects a HotSpot icon on the map displayed in map view window 1720. A dialog box is then displayed to allow the user to modify any of the data contained on the corresponding HotSpot.

Add Branch Link: The user draws a path on the map displayed in map view window 1720, and optionally associates the path with an image sequence, in the manner specified with respect to the Add Branch operation. The user then specifies both a model document in database 104 and a node within that document's model as the endpoint of the branch link. This operation creates a branch link in the model, records a specification of the path (including all segments) in the branch link, records references to start and end nodes in the branch link, and adds a reference to the branch link to the start and end nodes. Note that the end node is not reached by traversing the branch link; the destination is the remote node.

Delete Branch Link: The user selects a path on the map displayed in map view window 1720. The path is removed from the map, the associated branch link is removed from the model, and only references to the branch link are removed from the nodes connected by the branch link.

Edit Branch Link: The user selects a path on the map displayed in the map view 1720. A dialog box is then displayed to allow the user to modify any of the data contained in the associated branch link.

Save Model: The user is prompted for a file name, and the contents of the Model Database are written to the file specified by the user Playback The playback capability allows a user to execute the model, resulting in an interactive tour of the virtual environment. There are two separate functions involved in playback: processing image frames and handling user input. Conceptually, the processing of image frames occurs iteratively in the main processing loop of the program, while user input is handled asynchronously.

The program initiates the playback capability by preparing map view window 1120. First a static background image is drawn. This is typically a building floor plan or other representation of the physical environment. Next the program draws each path, intersection, and HotSpot represented in model database 104. The program displays an image frame associated with the default initial node in main view window 1110. The program further displays available choices of outgoing branches from the initial node. Once the user selects a branch to follow, playback begins. The program highlights the selected path and the path's destination intersection on the map and begins real-time display of the image frame sequence. As execution continues along a branch, the user may pause and execute any HotSpot encountered along the path. As execution reaches the end of the path, the program displays available branch choices for the upcoming node. The user makes a selection to continue execution.

Figure 4:
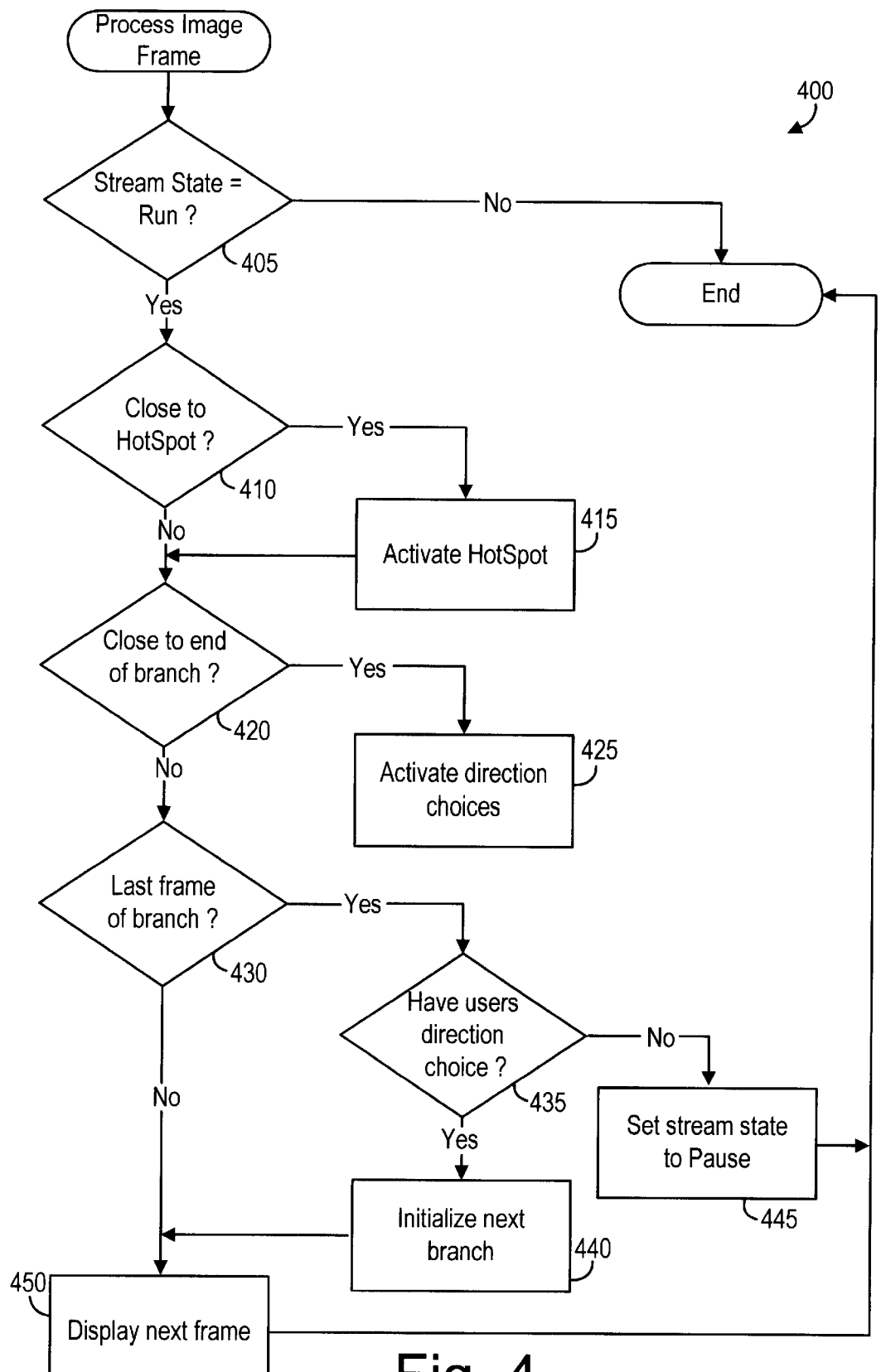
FIG. 4 is a functional flow diagram that illustrates the logic and actions of the image frame sequence processing function.

FIG. 4 is a flowchart of image frame processing operation 400. Operation 400 first looks for certain conditions that require special processing. When all conditions have been handled, the next available image frame is rendered. First, stage 405 determines whether the active stream is set to a Run state. If the stream state is not set to Run, image playback is paused and operation 400 terminates. Next, stage 410 determines whether the current frame is close to a HotSpot. Proximity is determined either with respect to a number of frames or to a time delta. If the test is true, in stage 415 the HotSpot is activated (e.g., by highlighting the HotSpot icon in map view window 1120 and alerting the user to the proximity of the HotSpot via a visual and/or auditory queue).

Figure 5A:
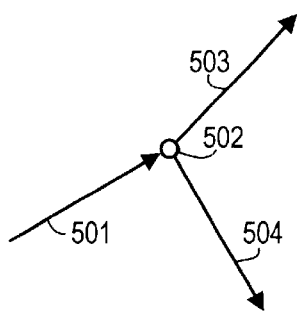
FIGS. 5a, 5b, and 5c illustrate the rotation of path vectors from absolute to user-relative coordinates.
Figure 5B:
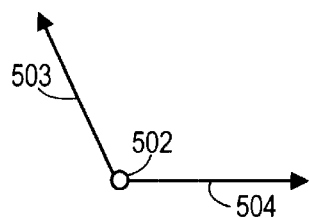

Stage 420 then determines whether the current frame is at the end of the current branch. Proximity is again determined either with respect to a number of frames or to a time delta. If the test is true, path choices are activated in stage 425. Path choices are the set of paths branching out from the upcoming intersection. Activation includes first calculating the set of path choices and then displaying the choices for user selection. Calculation is required because path choices are always displayed relative to the current direction of travel (i.e. from the user's viewpoint), rather than according to a fixed coordinate systems. FIG. 5a illustrates a sample scenario where path 501 enters intersection 502, and paths 503 and 504 leave intersection 502. If the current playback location is along path 501, the choices presented to the user at intersection 502 are to take either left path 503 or right path 504. FIG. 5b illustrates these choices from the user's viewpoint. Since display of path choices is from the user's viewpoint, the user's current direction of travel corresponds to straight upscreen, 90 degrees left and right correspond to straight left and right, respectively, on the screen, while 180 degrees backwards corresponds to straight downscreen.

Figure 5C:
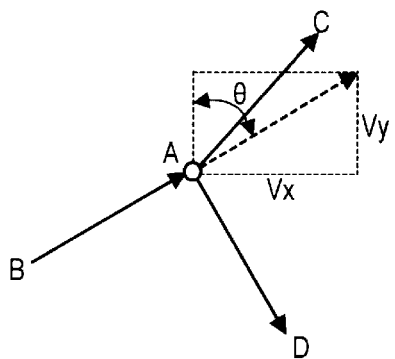

Calculation of path choices is accomplished as follows. Recalling that a branch may represent a path of multiple line segments, the geometrical orientation of an outgoing branch is determined by a vector of a first line segment of the branch. The orientation of an incoming branch is likewise determined by a vector of a last segment in the branch. The incoming direction vector (representing the user's point of view) is rotated such that the vector points "up" (i.e., the vector aligns with a 90 degrees angle). The difference angle between the original orientation of the incoming vector and the rotated vector is the angle by which all of the outgoing branch's vectors are rotated. In FIG. 5c, segment BA is the vector of the incoming branch (path 501), and segments AC and AD are the vectors of outgoing branches 503 and 504. For each outgoing directional vector (xy), $$newX = x*\cos\theta - y*\sin\theta$$

$$newY = x*\sin\theta + y*\cos\theta$$

where θ is the difference angle.

As shown in FIG. 5c, sinθ and cosθ represent components Vx and Vy, respectively, of the incoming vector, so there is no need to compute the actual difference angle.

Figure 6:
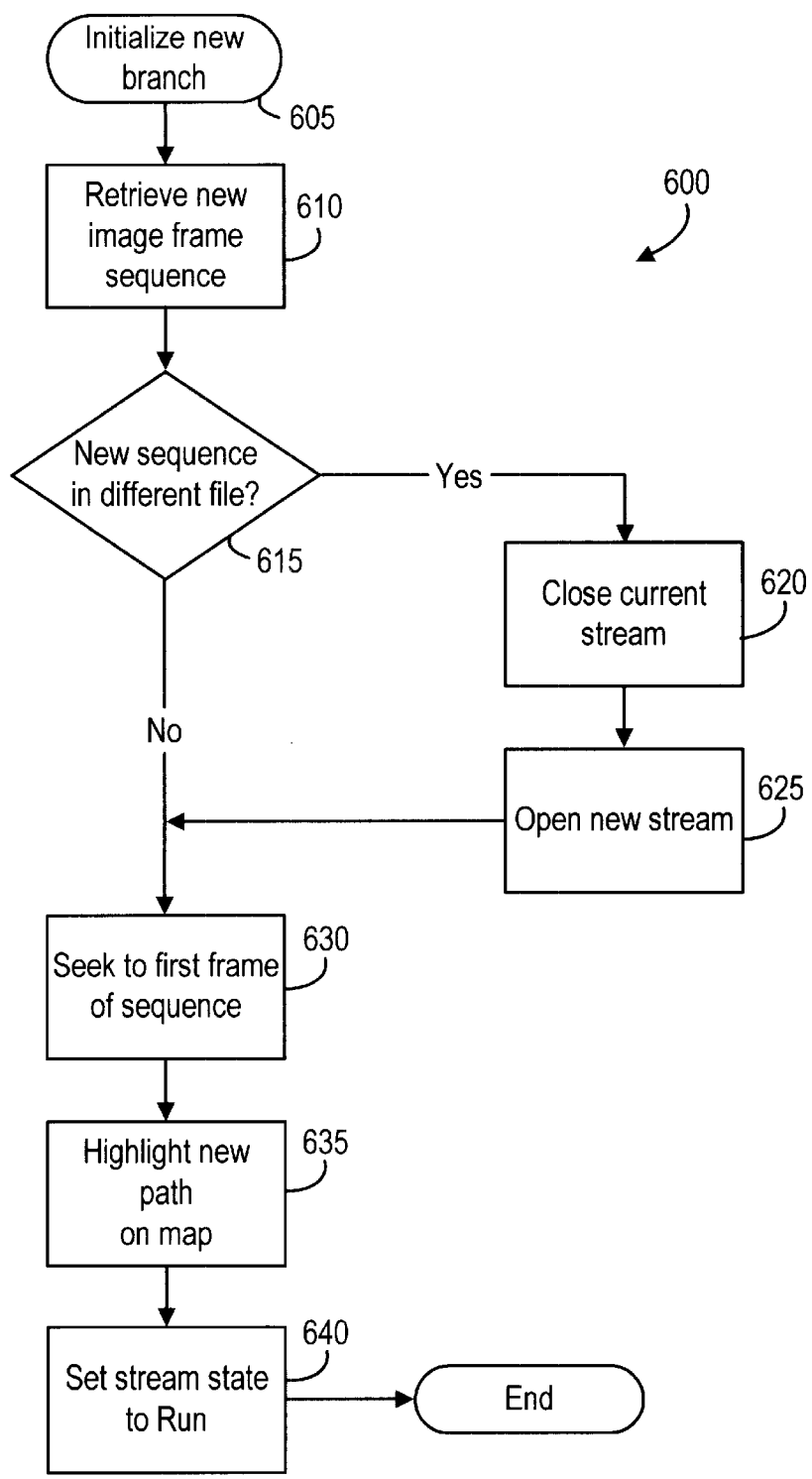
FIG. 6 is a functional flow diagram that illustrates the process of initializing a new branch for playback.

Finally, stage 430 determines whether the current frame is the last frame of the branch. If the test is true, stage 435 determines whether the user has chosen a branch to proceed on. Otherwise the stream state is set to Pause in stage 445 and operation 400 terminates. If a branch choice is available, the image frame sequence that corresponds to the chosen branch is initialized in stage 440, as illustrated in FIG. 6 (operation 600). First, the location of the next image frame sequence is retrieved from the new branch in stage 610. Stage 615 then determines whether the next sequence is stored in a different file from the current sequence, in which case the stream of the old file is closed in stage 620 and a stream for the new file is opened in stage 625. The program then seeks to the first frame of the sequence, in stage 630. The path on the map that corresponds to the new branch is highlighted in stage 635. Finally, the program sets the stream state to Run in stage 640 and operation 600 terminates.

The final step in operation 400 is to render the next image frame in main view window 1110 in stage 450.

During image frame processing, the user can manipulate various controls to control playback. The present invention interleaves handling of asynchronous input events with image frame processing. The following sections describe the processing of possible input events.

Choose Branch: Each node in the model has one or more branches leading away from the node. In two instances, when the tour reaches a node and when an input event causes a jump to a node, the user must choose a branch to follow away from the node. The program displays branch choices available to the user as control icons in main view window 1110. The user selects one of the icons, indicating the preferred choice (FIG. 12). This action triggers the Choose Branch input event. The program processes the event by storing the chosen branch. The choice is then retrieved and used by the image frame processing loop as described above.

Jump to Node: At any point, the user may cause the image frame display to jump to an arbitrary node in the model by selecting an associated intersection in map view window 1120. This action triggers a Jump to Node input event. Upon receiving the event, the program identifies the image frame associated with the selected node. If the new image frame is stored in a different file than the previous image frame sequence, the program closes the previous input stream and opens a stream to the new image file. The program then sets the stream state to Pause and displays the image frame associated with the new node in main view window 1110. Note that this image frame is the final frame of one of the incoming branches. The program highlights the associated path in map view window 1120 to help orient the user at the new location. The program then calculates branch choices for the node and displays them in a correct orientation relative to the user's view point (FIG. 11).

Figure 13:
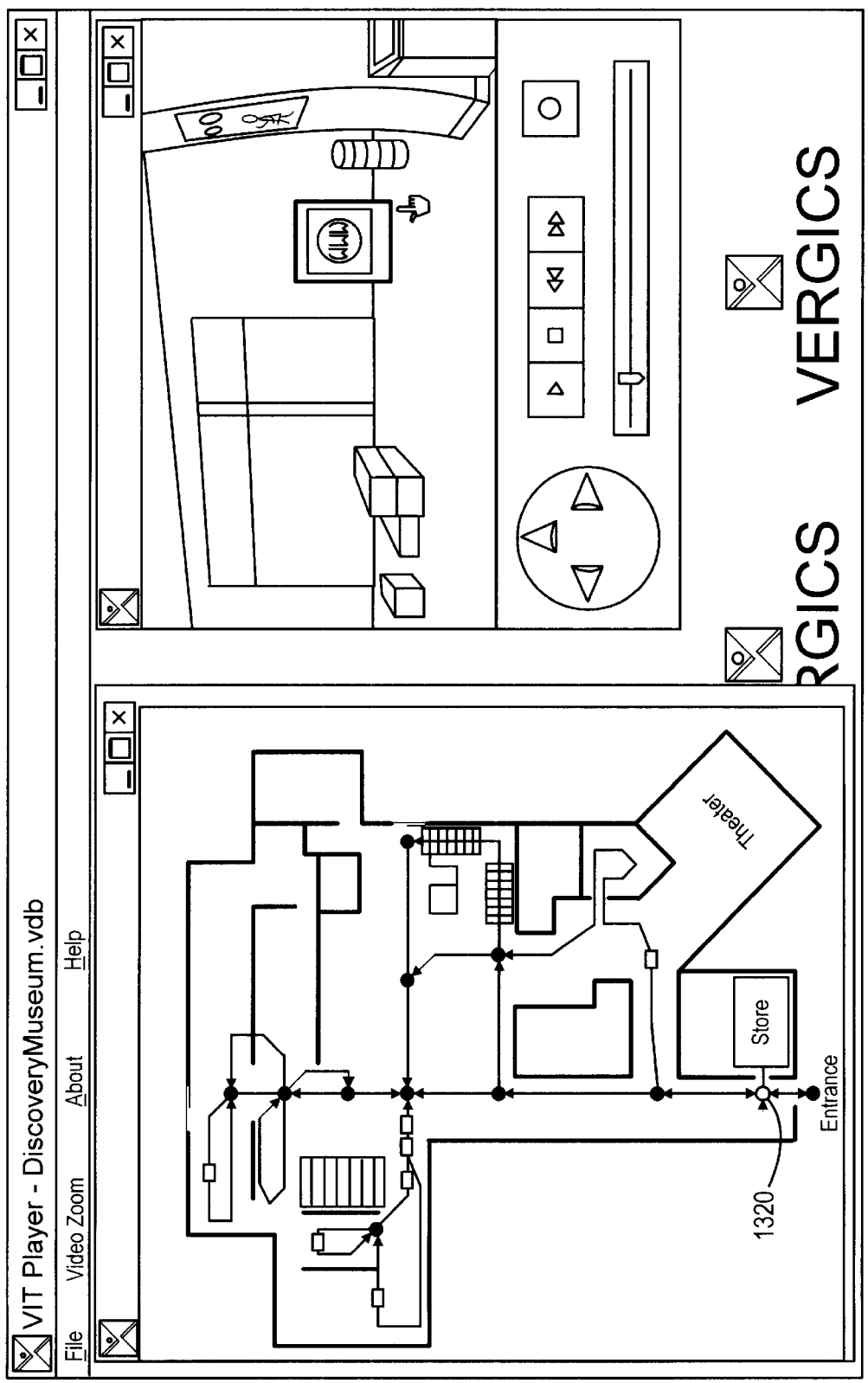
Figure 14:
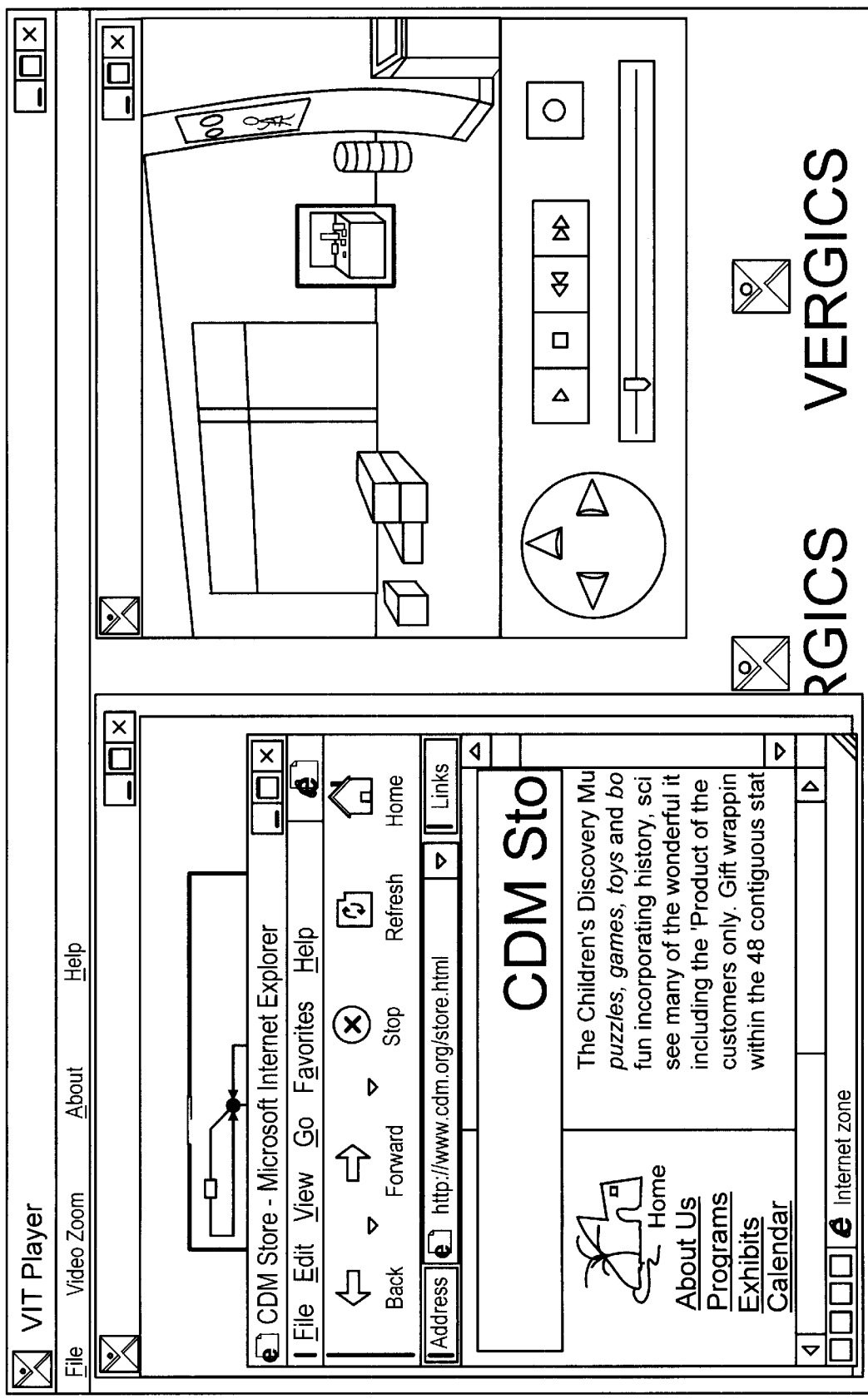
Figure 15:
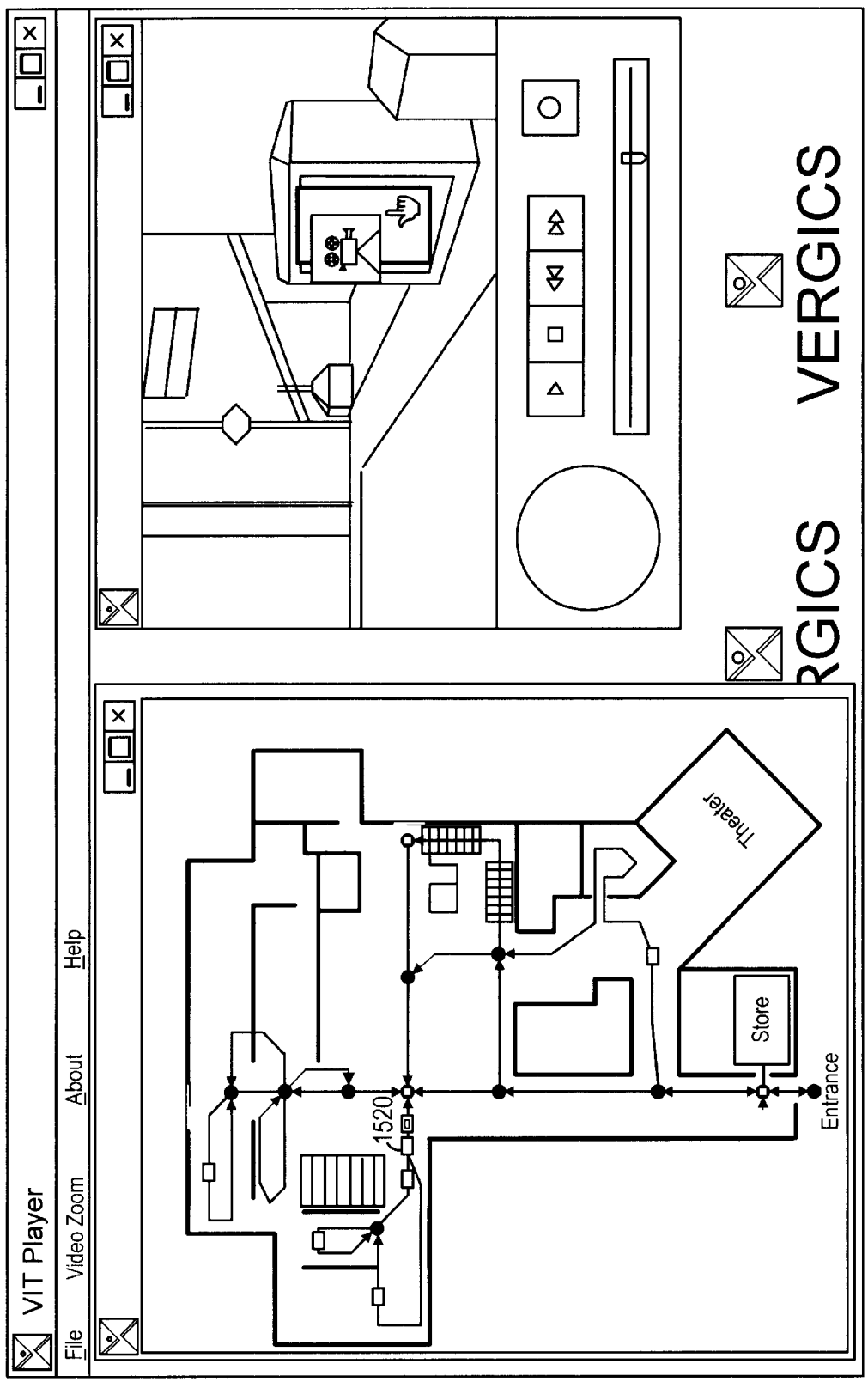
Figure 16:
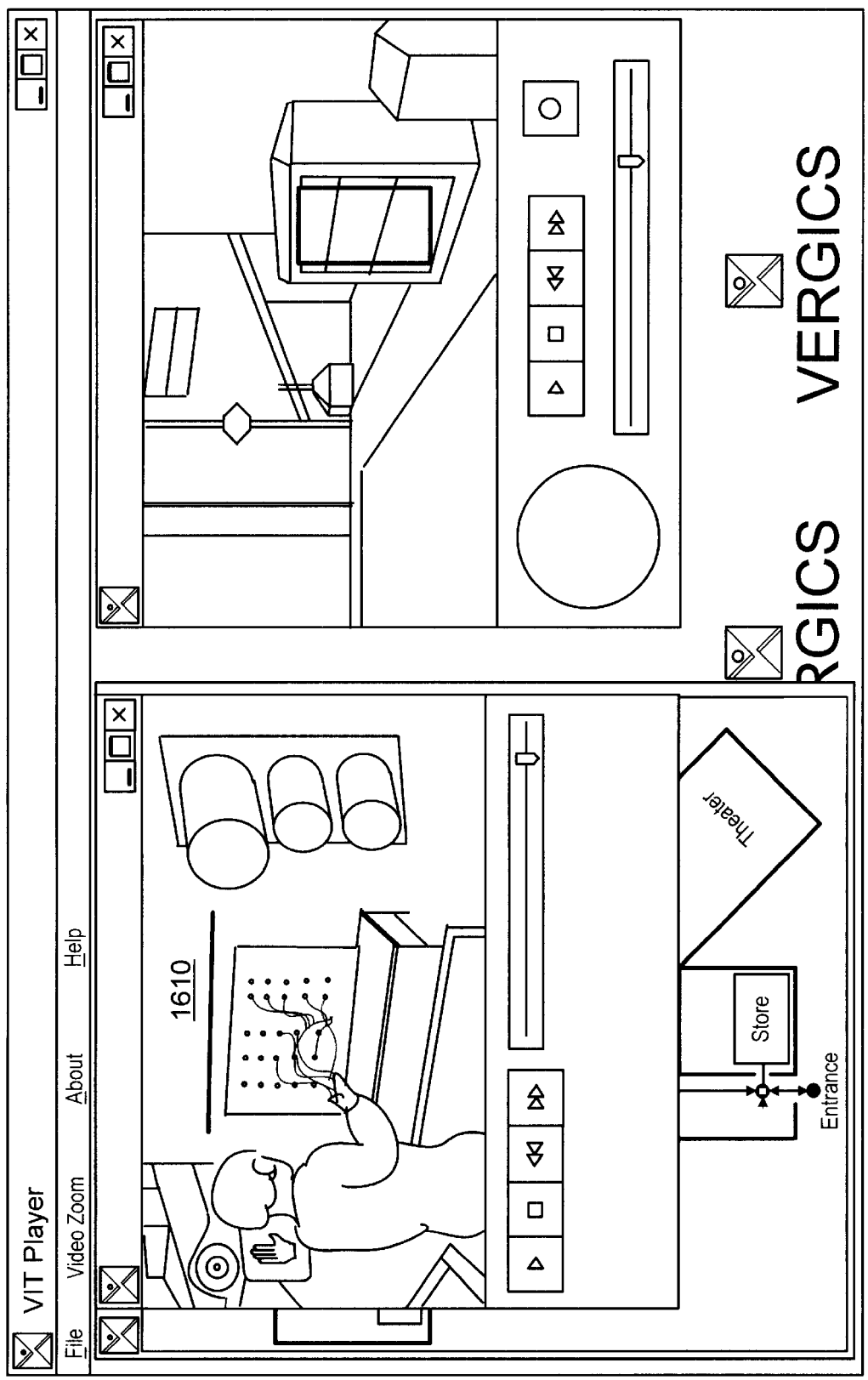

Jump to HotSpot: At any point, the user may cause the image frame display to jump to an arbitrary HotSpot in the model by selecting an associated HotSpot icon (e.g., HotSpot icons 1320 and 1520 in FIGS. 13 and 15, respectively) in map view window 1120. This action triggers a Jump to HotSpot input event. The processing of this event is similar to the processing of a Jump to Node event. The program initializes the image frame sequence for the branch on which the HotSpot is located. The program then displays a particular image frame associated with the HotSpot and highlights the new path on the map. Finally, the program overlays the HotSpot's bounded region of interest on the displayed video frame and highlights the HotSpot icon on the map (FIGS. 13 and 15).

Open HotSpot: Whenever a HotSpot region of interest is displayed in main view window 1110, the user may open the corresponding HotSpot by selecting the region of interest. This action triggers an Execute HotSpot event. Upon receiving this event, the program first determines the type of document (e.g. text, image, audio) referred by the HotSpot. The program then pops up an appropriate type of window to display the data contained in the document (e.g., popup windows 1410 and 1610 in FIGS. 14 and 16, respectively). The program then opens the document and displays the document's contents in the pop up window. For streaming types of data (i.e., audio clips, video clips or image sequences), the program creates the stream and initializes a popup window to the starting frame specified by the HotSpot. User controls are then attached to the popup window and the stream state is set to Run. If the HotSpot is an interactive game or exhibit a database model file is loaded, but no map view window is created, since the map represents a conceptual flow.

Pause: At any point during playback, the user may cause the image frame display to stop at the current frame by selecting a Pause control 1150 in main view window 1110. Upon receiving this event, the program sets the stream state to Pause, thereby preventing the image display function from displaying subsequent frames.

Play: Once playback is performed, the user may cause image frame display to resume from the paused state by selecting Play control 1140 in main view window 1110. Upon receiving this event, the program sets the stream state to Run, thereby enabling the image display function to display subsequent frames.

Fast Forward: During image frame playback, the user may cause the program to increase the speed of frame display by selecting Fast Forward control 1170 in main view window 1110. Upon receiving this event, the program displays the remainder of the current image frame sequence (i.e., the current path) at double the normal speed rate (some frames may be skipped during this operation).

Fast Reverse: During image frame playback, the user may cause the program to display image frames in reverse order by selecting Fast Reverse control 1160 in main view window 1110. Upon receiving this event, the program displays the current image frame sequence in reverse order at double the normal speed rate (some frames may be skipped during this operation).

Browse: At any point, the user may cause the program to scan through all of the image frames in the model by use of the Browse control 1180 in main view window 1110. Browse control 1180 is continuously variable over a range of values. When Browse control 1180 is activated an event is opened that contains two values: a state value that indicates whether the control is engaged or disengaged and an index value that indicates the position of the control. Upon receiving this event, the program sets the stream state to Pause. If the control state is Engaged, the program maps the index value to one of the branches in the model and highlights the associated path on the map. If the control state is Disengaged, the program maps the index value and highlights a path as described above. The program further calculates a particular image frame within the branch's frame segment, retrieves that frame, and displays the frame in main view window 1110.

Figure 7:
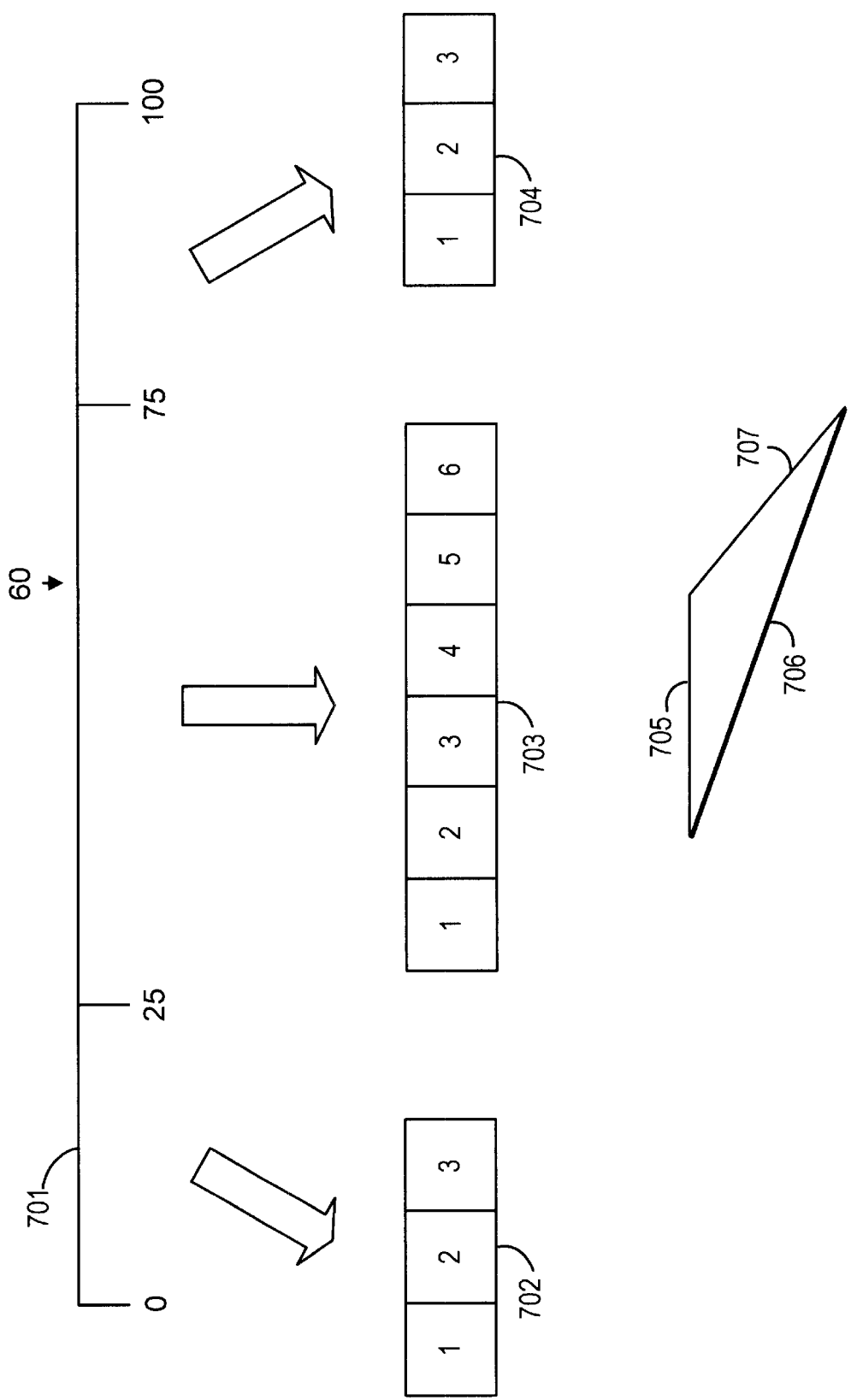
FIG. 7 illustrates the calculation of branches and image frames for the Browse event.

The image frame calculation is based on an arbitrary serial ordering of all branches in the model. This function maps the range of Browse index values over the resulting serial sequence. A specific index value is then mapped to an offset within a specific branch, the image frame at that offset in the branch's associated image frame sequence is then identified. FIG. 7 illustrates this function. Paths 705, 706, and 707 represent the branches of a simple model. They are associated with frame sequences 702, 703, and 704, respectively. A range of index values 701 maps to the three sequences, as shown in FIG. 7. For example, an index value of 60 falls within the subrange that maps to sequence 703, and the program highlights path 706 accordingly. Once the offset of the given index value within the subrange is calculated the index value is further, it is straightforward to mapping to frame 5 in frame sequence 703.

Figure 9A:
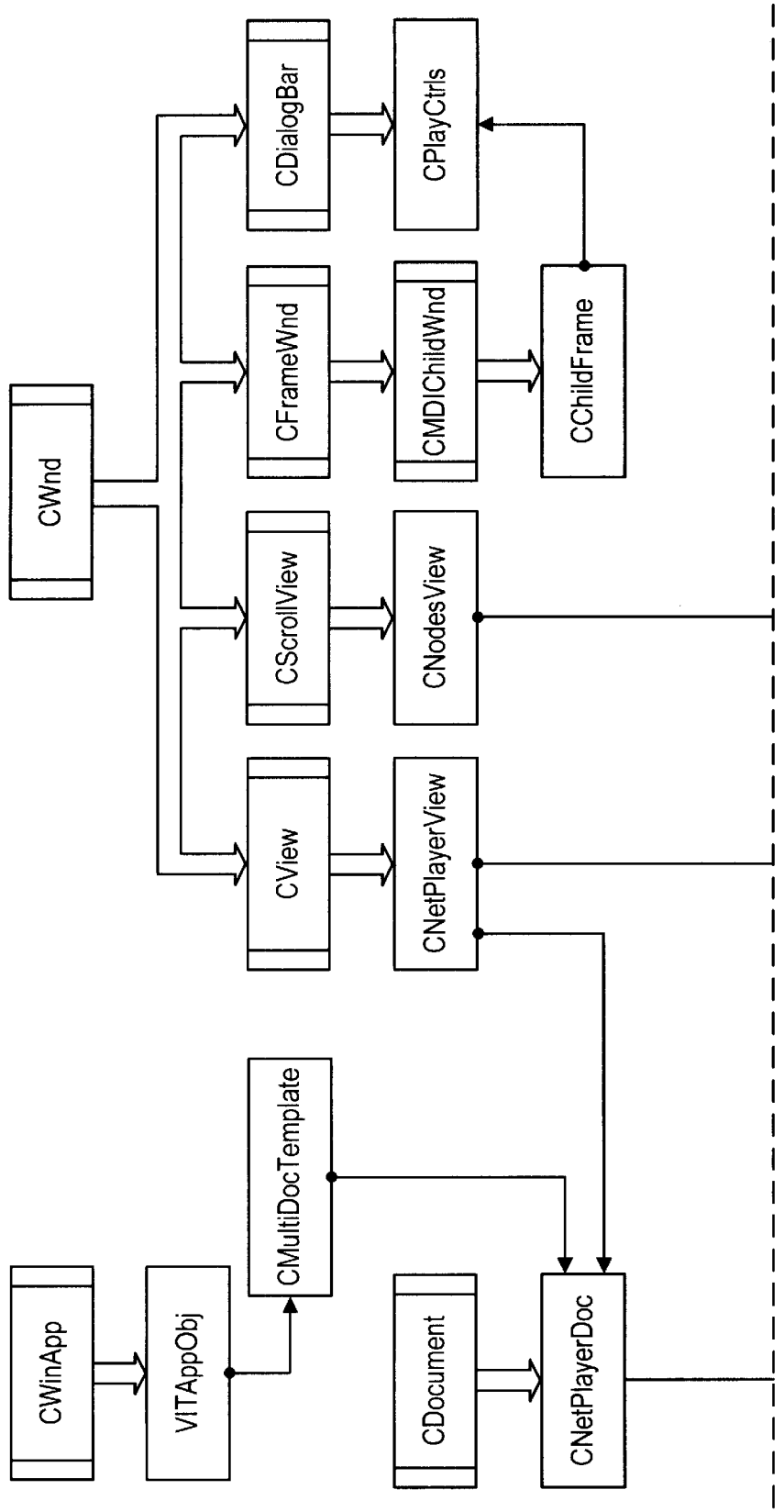
FIGS. 9A and 9B illustrates the derivation of the software classes that comprise the application library.
Figure 9B:
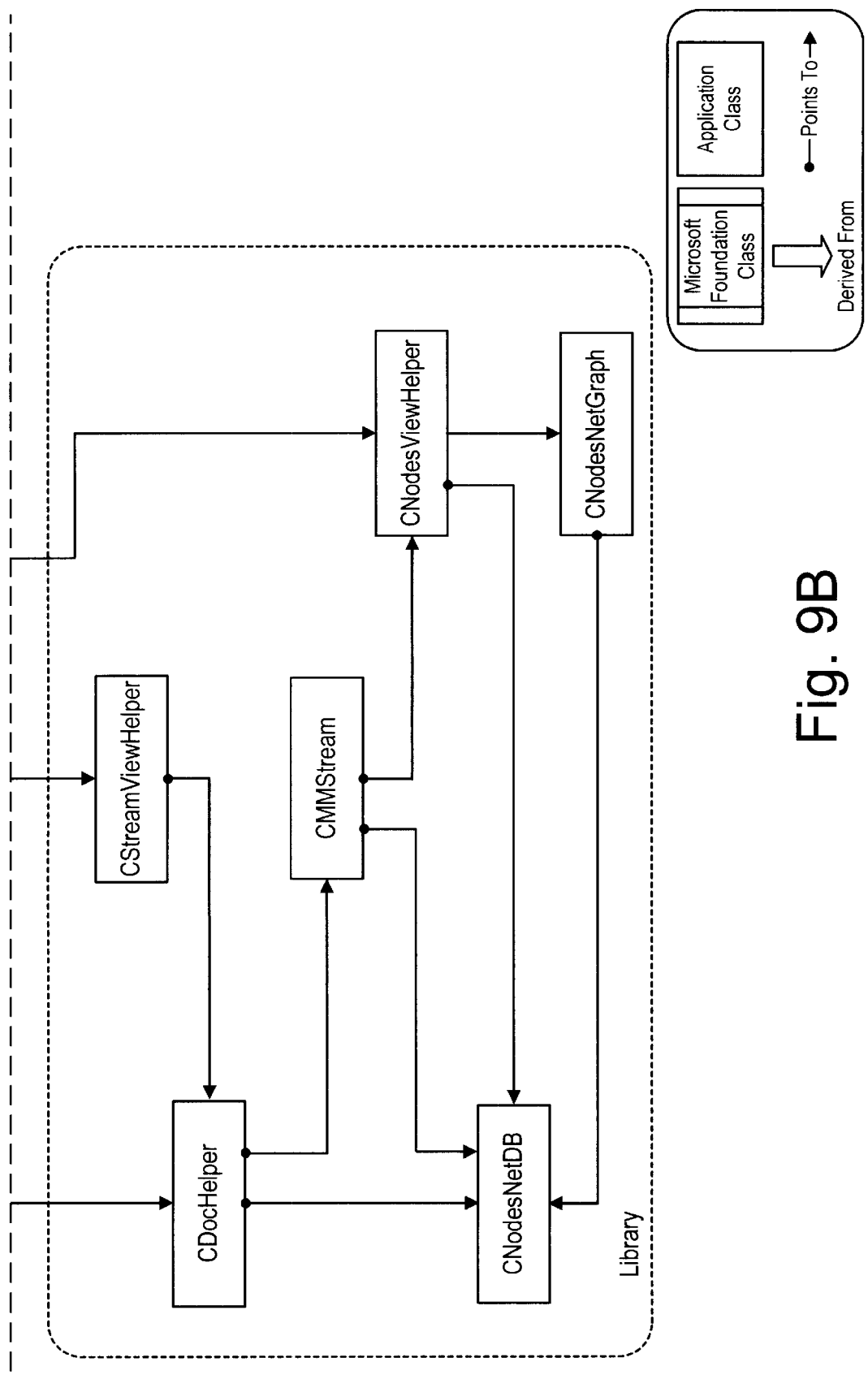
Figure 10:
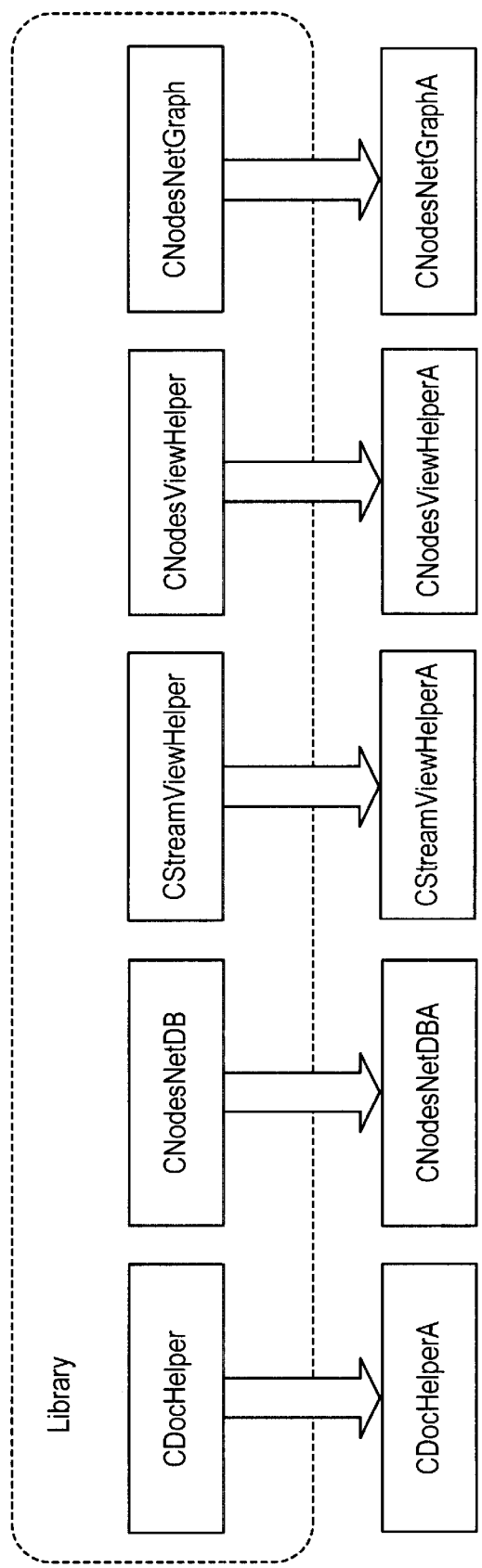
FIG. 10 illustrates the derivation of authoring classes from the application library.

FIGS. 9A, 9B and 10 show the architecture of the application software classes that implement the present invention. As illustrated in FIGS. 9A and 9B, the application software comprises a set of classes derived from the Microsoft Foundation Classes (MFC), as well as application classes that make up a separate application library. In addition to inheritance relationships between classes, the application specific classes are related to one another through pointer references. MFC-derived classes (VITAppObj, CMultiDocTemplate, CNetPlayerDoc, CNetPlayerView, CNodesView, CChildFrame, and CPlayCtrls) provide the operations that are specific to Microsoft Windows user interface. Examples of such operations are creating and deleting windows and receiving events from the pointing device.

Application specific library classes implement the core functionality of the program of the present invention. For instance, these classes implement the playback capability. The role of each of the application library classes is as described below:

CDocHelper: This class creates and stores each of the stream objects (CMMStream) needed by the document. This class also, keeps track of the currently active stream.

CNodesNetDB: This class stores and provides access to the elements of the model.

CStreamViewHelper: This class performs processing required for stream views (the main view and streaming popup views). This class further interprets and processes events (e.g. user controls and HotSpot invocation) received from one of these views by class CnetPlayerView.

CMMStream: This class performs processing required for streams (e.g. opening and closing stream files).

CNodesViewHelper: This class performs processing required for the map view. This class further interprets and processes events (e.g., jumping to intersections) received from the map view by class CnodesView.

CNodesNetGraph: This class draws model elements in map view window 1120.

A set of application classes derived from the application library classes add editing operations to the basic library operations. For example, these classes implement the authoring capability. FIG. 10 illustrates the relationships between library classes and authoring classes. It will be apparent to those skilled in the art that the operations of the playback program are a subset of those of the authoring program. That is, the authoring program contains every operation of the playback program, plus additional operations. These classes, and the additional operations that they provide, are described below:

CDocHelperA: This class provides the capability to select a bitmap file (static background) for the document.

CNodesNetDBA: This class modifies the model database, both adding and deleting model element data.

CStreamViewHelperA: This class provides operations to modify stream views, specifically adding HotSpots to the view. This class invokes operations in CNodesNetDBA to update the database for new HotSpots.

CNodesViewHelperA: This class provides operations to modify the map view, specifically adding, deleting, and editing the model elements that are represented in map view window 1120 (e.g., nodes, branches, branch links). This class further invokes operations in CNodeNetGraphA to update the drawings of model elements in the map view.

CNodeNetGraphA: This class provides operations to modify the drawings of model elements in the map view.

A further embodiment of the present invention uses the model as the underlying representation of a video game. A video interactive game can be scripted entirely without programming or geometric modeling by constructing a graph of decision nodes with branches. The outgoing branches of a node represent actions or decisions that are taken in the flow of the game. Each outgoing branch has a distinct orientation vector. The game associates each unique vector with a user interface control. For example, assume a simple control device with three buttons (e.g. a three-button mouse). All vectors in the graph that are oriented at 90 degrees could be controlled by interface button A, all vectors at 45 degrees by button B, and all vectors at 180 degrees by button C.

Assume the game is initialized to start at some default node in the graph. If from that location the user pushes button A, the game follows the branch oriented at 90 degrees. This brings the user to the node at the end of this branch. If at this node the user presses button B, the branch at 45 degrees is followed, thus connecting to the next node. If there is no branch that corresponds to the input, the game position is not advanced. The game may also have disconnected nodes (nodes that cannot be reached by a branch in the graph) or, in fact, multiple disjunct graphs. In this case, the user interface must provide the capability to pass node identifiers to the program in order to effect jumps to disjunct nodes. Note that in this embodiment, the graph is not displayed as a map since it functions as a decision graph, rather than as a map of a spatial environment.

It will be apparent to those skilled in the art that the same program code is used to traverse the graphs in both embodiments. The difference between the environments resides in the format of the user interface.

Furthermore, application can be extended to support multiple players. Players navigating the same model can be represented on the map with different symbols and placed on appropriate locations on the branches they travel on.

Application can be integrated with other collaborative programs such as chat (text or voice), (e.g., Netmeeting). Players can then open a communication channel with other players by simply clicking on symbols corresponding to the other players.

Furthermore, computer-generated graphics can be integrated with the video to allow for more complex animations composited within video to support interactive 3-D games.

The present invention can also be applied to training materials for complex procedures. For example, a video illustrating the actual procedure taking place can be shown next to a conceptual flow of the presentation shown in map view window 1120 with the branches highlighting the current stage in the procedure. Additional types of hot spots can be inserted by user such as personal notes and links to other pertinent information to help the learning process.

In addition, video games or interactive exhibits can be scripted by building the network of decision points and branches, with no special programming (already demonstrated in the current embodiment).

Furthermore, stories with multiple alternative endings can be developed in accordance to the principles of the invention. For instance, an application can be built where kids assemble segments of the story in different ways to create new stories.

Virtual shopping mall and virtual stores can also be developed in accordance to the principles of the invention. Currently on-line shoppers must know in advance exactly what they want to search within a category. By associating Hot spots to items shown in a moving video of a real store, the computer system of the present invention replicates a real life shopping experience, allowing, for example, impulse buying. Users can obtain more information about an item shown in the video by simply clicking on a corresponding hot spot. The item is, in turn, associated with unique URL of the site's e-commerce database. Users can thus add the item to their electronic shopping basket.

Finally, the computer system of the present invention is also suitable for high-bandwidth applications. Video files encoded according to a broadcast quality standard such as MPEG2 can be streamed over high-speed networks to allow virtual visits to remote sites (e.g., museums, historic sites, etc.).

Embodiments described above illustrate but do not limit the invention. In particular, the invention is not limited by any particular graphical user interface. In fact, any graphical user interface known in the art to perform the functions described herein can be used in accordance to the principles of the invention. In addition, the invention is not limited to any particular hardware/software implementation. Those skilled in the art realize that alternative hardware software implementations can be employed in lieu of the one described herein in accordance to the principles of the present invention. Other embodiments and variations are within the scope of the invention, as defined by the following claims.

I claim:

1. A method of selling goods on-line, the method comprising:

generating a virtual store environment from a real store environment, the virtual store environment comprising a plurality of nodes connected by branches, wherein each node represents an intersection in the real store environment and each branch represents a path connecting intersections in the real store environment;

displaying a map of at least a portion of the nodes and branches of the virtual store environment in a first window of a display device of a computer;

displaying a visual representation of the virtual store environment in a second window of the display device;

allowing a user to navigate through the virtual store environment by entering navigation commands via at least one input device connected to the computer;

allowing the user to select for purchase at least one item displayed in the second window; and completing a purchase transaction on-line to transfer ownership of the selected item to the user.

2. The method of claim 1, wherein the computer is connected to a server computer via a global-area network and the virtual store environment is stored on the server computer.

3. The method of claim 1, wherein the user can obtain further information about an item by selecting an element displayed in the first or the second window associated with the item.

4. The method of claim 1, wherein each path in the map further comprises directional information, and the directional information is expressed relative to a current position in the map.

5. A computer system for selling goods on-line, the computer system comprising:

a computer;

a display device connected to the computer;

one or more input devices connected to the computer; and a computer program executing on the computer, wherein the computer program comprises computer instructions for:

generating a virtual store environment from a real store environment, the virtual store environment comprising a plurality of nodes connected by branches, wherein each node represents an intersection in the real store environment and each branch represents a path connecting intersections in the real store environment;

displaying a map of at least a portion of the nodes and branches of the virtual store environment in a first window of the display device;

displaying a visual representation of the virtual store environment in a second window of the display device;

allowing a user to navigate through the virtual store environment by entering navigation commands via at least one input device;

allowing the user to select for purchase at least one item displayed in the second window; and completing a purchase transaction on-line to transfer ownership of the selected item to the user.

6. The computer system of claim 5, wherein the computer is connected to a server computer via a global-area network and the virtual store environment is stored on the server computer.

7. The computer system of claim 5, wherein the user can obtain further information about an item by selecting an element displayed in the first or the second window associated with the item.

8. The computer system of claim 5, wherein each path in the map further comprises directional information, and the directional information is expressed relative to a current position in the map.

9. A computer-readable storage medium comprising computer instructions for:

generating a virtual store environment from a real store environment, the virtual store environment comprising a plurality of nodes connected by branches, wherein each node represents an intersection in the real store environment and each branch represents a path connecting intersections in the real store environment;

displaying a map of at least a portion of the nodes and branches of the virtual store environment in a first window of a display device of a computer;

displaying a visual representation of the virtual store environment in a second window of the display device;

allowing a user to navigate through the virtual store environment by entering navigation commands via at least one input device connected to the computer;

allowing the user to select for purchase at least one item displayed in the second window; and completing a purchase transaction on-line to transfer ownership of the selected item to the user.

10. The computer-readable storage medium of claim 9, wherein the computer is connected to a server computer via a global-area network and the virtual store environment is stored on the server computer.

11. The computer-readable storage medium of claim 9, wherein the user can obtain further information about an item by selecting an element displayed in the first or the second window associated with the item.

12. The computer-readable storage medium of claim 9, wherein each path in the map further comprises directional information, and the directional information is expressed relative to a current position in the map.

* * * * *